United States Patent
Tran et al.

[11] Patent Number: 5,440,108
[45] Date of Patent: Aug. 8, 1995

[54] SYSTEM AND METHOD FOR DISPENSING AND REVALUNG CASH CARDS

[75] Inventors: Dich C. Tran, Cupertino; Yiu T. Liu, Hercules; Stanley Y. W. Lui, Santa Clara; Joseph Y. Kwong, Mountain View; Junqi Yan, Stanford, all of Calif.

[73] Assignee: Verifone, Inc., Redwood City, Calif.
[21] Appl. No.: 105,110
[22] Filed: Aug. 11, 1993

Related U.S. Application Data

[63] Continuation of Ser. No. 775,736, Oct. 11, 1991, abandoned.
[51] Int. Cl.⁶ .................................................. G06F 7/08
[52] U.S. Cl. .................................. 235/381; 235/380; 235/492
[58] Field of Search ................. 235/381, 449, 492; 364/479

[56] References Cited

U.S. PATENT DOCUMENTS

| | | | |
|---|---|---|---|
| 3,560,715 | 2/1971 | Akamatsu | 235/462 X |
| 3,602,695 | 8/1971 | Boss . | |
| 3,774,743 | 11/1973 | Hendrickson . | |
| 3,786,421 | 1/1974 | Wostl et al. . | |
| 3,826,344 | 7/1974 | Wahlberg . | |
| 3,828,903 | 8/1974 | Levasseur . | |
| 3,836,753 | 9/1974 | Pass . | |
| 3,872,438 | 3/1975 | Cuttill et al. . | |
| 3,935,933 | 2/1976 | Tanaka et al. . | |
| 4,020,325 | 3/1977 | Pfost et al. . | |
| 4,048,475 | 9/1977 | Yoshida . | |
| 4,151,564 | 4/1979 | Schreiber et al. . | |
| 4,197,988 | 4/1980 | Moss | 235/381 |
| 4,216,506 | 8/1980 | Ludtke et al. . | |
| 4,271,351 | 6/1981 | Bloodworth . | |
| 4,278,879 | 7/1981 | Hofmann | 235/380 |
| 4,300,042 | 11/1981 | Oldenkamp et al. . | |
| 4,361,754 | 11/1982 | Hoskinson et al. . | |
| 4,476,507 | 10/1984 | Koike et al. . | |
| 4,513,199 | 3/1985 | Sidline . | |
| 4,518,852 | 5/1985 | Stockburger et al. . | |
| 4,527,052 | 7/1985 | Kilborn . | |
| 4,581,523 | 4/1986 | Okuno . | |
| 4,599,510 | 7/1986 | Barth et al. . | |
| 4,616,128 | 10/1986 | Case . | |
| 4,669,596 | 6/1987 | Capers et al. | 235/381 |
| 4,752,676 | 6/1988 | Leonard et al. | 235/449 |
| 4,767,917 | 8/1988 | Ushikobo | 235/381 |
| 4,788,420 | 11/1988 | Chang et al. . | |
| 4,803,349 | 2/1989 | Sugimoto et al. . | |
| 4,812,632 | 3/1989 | Kakinuma et al. . | |
| 4,833,310 | 5/1989 | Shimamura et al. . | |
| 4,837,426 | 6/1989 | Pease et al. . | |
| 4,847,475 | 7/1989 | Watabe et al. . | |
| 4,861,974 | 8/1989 | Kondo et al. . | |
| 4,879,607 | 11/1989 | Redemacher . | |
| 4,879,744 | 11/1989 | Tasaki et al. . | |
| 4,884,212 | 11/1989 | Stutsman | 364/479 |
| 4,900,906 | 2/1990 | Pusic | 235/381 |
| 4,900,908 | 2/1990 | Tsutsui . | |
| 4,906,988 | 3/1990 | Copella . | |
| 4,968,873 | 11/1990 | Bethlorr | 235/492 |
| 5,019,696 | 5/1991 | Chang et al. . | |
| 5,175,423 | 12/1992 | Kryan | 235/477 |
| 5,272,320 | 12/1993 | Hakamada | 235/380 |
| 5,291,003 | 3/1994 | Avnet | 902/30 |

FOREIGN PATENT DOCUMENTS 1173540 8/1984 Canada .
3142310 6/1982 Germany .

OTHER PUBLICATIONS

IBM Technical Disclosure Bulletin, vol. 16, No. 1, Jun. 1973, p. 286.
Securities and Exchange Commission-Form 10-K, SEC Form 10-K-Annual report pursuant to Section 13 or 15(d) of the Securities and Exchange Act of 1934 for the fiscal year ended Dec. 28, 1990.

*Primary Examiner*—Harold Pitts
*Attorney, Agent, or Firm*—Flehr, Hohbach, Test, Albritton & Herbert

[57] ABSTRACT

A cash card dispensing and revaluing system having payment apparatus for receiving and validating payment operating in conjunction with a cash card dispensing assembly for storing a number of cash cards and for dispensing a cash card upon consumer request and payment of a predetermined payment amount. Additionally including in the system a cash card revaluing assembly for revaluing a cash card upon insertion of the card into the revaluing assembly in conjunction with insertion of payment into the payment apparatus. The payment apparatus includes currency accepting and validating systems such as bill validators or, alternatively, credit and debit card validators.

2 Claims, 30 Drawing Sheets

SYSTEM AND METHOD FOR DISPENSING AND REVALUNG CASH CARDS

This is a continuation, of application Ser. No. 07/775,736 filed Oct. 11, 1991, now abandoned.

CROSS-REFERENCE TO RELATED APPLICATIONS

Following applications assigned to the same assignee are incorporated herein by reference: Ser. No. 07/775,798 Entitled "Linear Scanner Apparatus for Communicating with a Data Card"; Ser. No. 777,764 now U.S. Pat. No. 5,291,003 Entitled "Modular Cash Card System Design"; and Ser. No. 07/775,266 now abandoned Entitled "Dispensing Machine with Data Card Scanner Apparatus and Enhanced Features" all filed Oct. 11, 1991.

FIELD OF THE INVENTION

This invention relates generally to systems and methods for communicating with data record stripes on data cards. More particularly, this invention relates to a system and method for dispensing prevalued cash cards and revaluing the data stripe on cash cards.

BACKGROUND OF THE INVENTION

The merger of computer technology and financial systems has resulted in a lessening of society's reliance upon cash transactions to pay for a variety of goods and services. Many goods and services are paid for using credit and debit cards; these cards as well as cash cards are used to purchase goods from vending machines and cafeterias. Additionally, transit systems use cash cards for access to rail and bus services.

Typically, a cashless transaction using a data card such as a cash card is initiated by a consumer purchasing a prevalued card from a salesperson or a machine. Subsequently, the cash card is used to purchase the desired good or service. For vending machine, cafeteria, or transit system use, the card is scanned in some manner by a card scanner, the prevalued amount is read, the purchase made, and the new value, i.e., prevalue minus purchase cost, is written upon the cash card. After enough purchases are made to exhaust the prevalue, the card is discarded.

A significant drawback to the current cash card systems is that the cards are used until exhausted and then discarded. In an environmentally conscious society, excess waste should not be tolerated. It would be advantageous to provide a system in which the exhausted cash cards could be revalued using either cash or credit card as the form of payment. Additionally, it would be advantageous to provide new card dispensing and exhausted card revaluing at a single convenient location.

Accordingly it can be readily appreciated that there is a need in the art for a cash card dispensing and revaluing system which enables a consumer to purchase and revalue cash cards at a single location using cash or credit as a form of payment.

In response to the need defined above, the principal objective of the present invention is to provide a single system which dispenses prevalued cards and allows revaluing using either cash or credit as payment. Alternatively or in addition to cash or credit payment methods, a consumer may be able to make payment using a debit card.

SUMMARY OF THE INVENTION

In summary, the invention is a cash card dispensing and revaluing system having payment apparatus for receiving and validating payment operating in conjunction with a cash card dispensing assembly for storing a number of cash cards and for dispensing a cash card upon consumer request and payment of a predetermined payment amount. Additionally included in the system is a data card revaluing assembly for revaluing a cash card upon insertion of the card into the revaluing assembly in conjunction with insertion of payment into the payment apparatus. The payment apparatus includes currency accepting and validating systems such as bill validators or, alternatively, credit and/or debit card validators.

BRIEF DESCRIPTION OF THE DRAWINGS

The purpose and advantages of the present invention will be apparent to those skilled in the art from the following detailed description in conjunction with the drawings.

DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not to be limited to the embodiments shown, but is to be accorded the widest scope consistent with the principles and features disclosed herein.

Figure 1:
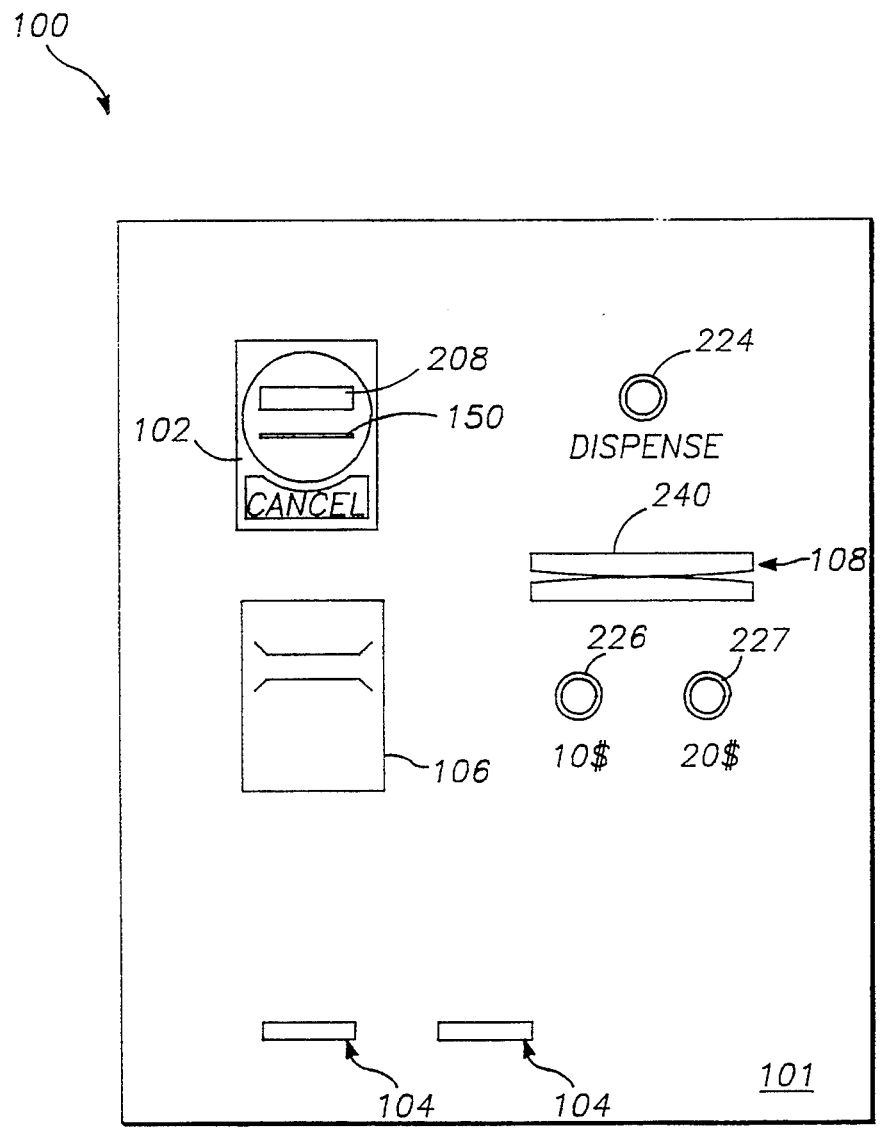
FIG. 1 is a front plan view of the invention in an exemplary configuration.

Referring to FIG. 1, a system for dispensing and revaluing cash cards 100 in accordance with the invention is depicted. A complete system 100 housed in a single assembly 101 contains a cash card scanner assembly 102 for reading and writing cash values to cash cards, one or more dispensers 104 for dispensing cash cards upon request and payment, and a variety of means for making payment. At a minimum, a bill validator 106 is used for making payment for both a new card or revaluing an old card. However, to ensure versatility a credit card reader and validator assembly 108 is used to permit credit to be used for revaluing a cash card. Alternatively, the credit card reader 108 is adapted to also read and validate debit cards to enable debit account funds to be used to revalue a cash card. Each of the hardware elements is described below.

Figure 2:
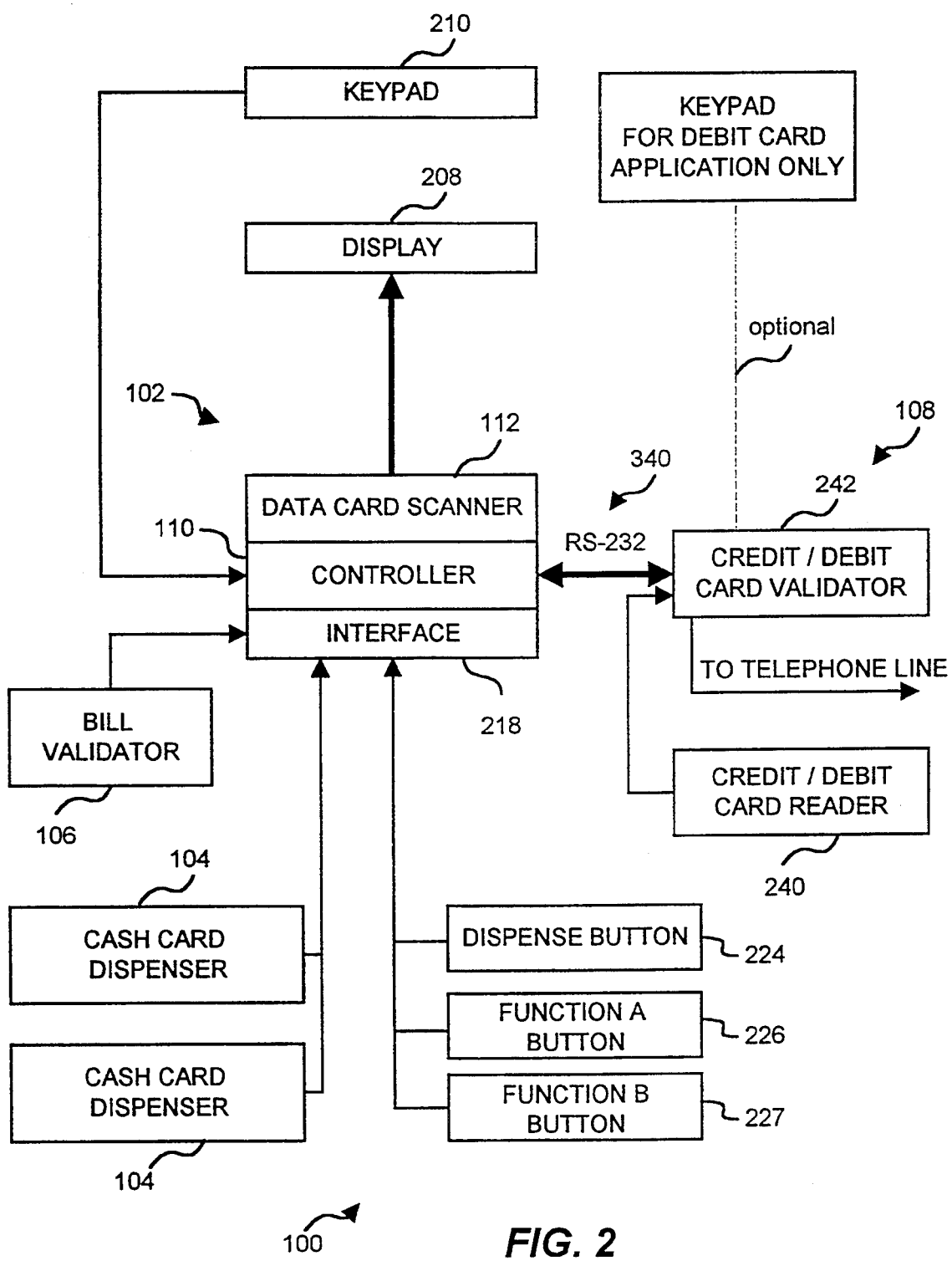
FIG. 2 is a block diagram of a preferred embodiment of the invention.

As depicted in FIG. 2, one or more cash card dispensers 104 are connected to interface and control circuitry 110 mounted on controller and interface printed circuit boards (PCB) of a data card reader/writer assembly 102. Data card dispensers 104 available from Asahi Seiko USA, Inc., 4029 South Industrial Blvd., Las Vegas, Nev. 89103 as model CD-200 or an equivalent type are used. The dispensers 104 store a stack of prevalued cards which are vended to consumers upon request and payment. The dispensers 104 are enabled and instructed when to dispense by the controller circuitry 110. The dispensers 104 have internal sensors which inform the controller circuitry 110 when a card is dispensed, when a card is jammed in the mechanism, and when the card storage rack is empty.

One manner in which payment for a new card or revaluing an old card can be made is through a commercially available bill validator 106 from Rowe International, Inc., Grand Rapids, Mich. 49507, model CBA-4 or an equivalent, communicating the amount of currency inserted therein to the controller circuitry 110. Additionally, the controller circuitry 110 enables and disables the bill validator 106 as necessary. The bill validator 106 accepts bills in $1, $5, $10, and $20 denominations. For each dollar of value, the bill validator 106 sends a digital pulse to the controller circuitry 110. For example, customer insertion of a $1 bill causes one pulse to be transmitted, a $5 bill sends five pulses, etc. Moreover, customer insertion of a series of bills will cause value accumulation by the controller circuitry 110 equivalent to the total of the value of the bills inserted. This form of bill validator 106 also performs a simple escrow function in which the last bill inserted is stored and is returned to the customer upon transaction cancellation. Other bill validator types are capable of escrowing a series of bills which are returned to the customer upon transaction cancellation. However, these bill validators are complex and costly.

The data card reader/writer 112 is one of a number of available types currently on the commercial market. Essential elements include transducers for detecting the data stored on the cash card, at least one transducer for writing data to the cash card, and an assembly for either scanning the card past the transducers or scanning the transducers past the card to accomplish the read and write functions. Linear motion reader/writer mechanisms having fixed transducers are disclosed in patents by Pass, U.S. Pat. No. 3,386,753; Pfost et al., U.S. Pat. No. 4,020,325; and Redemacher, U.S. Pat. No. 4,879,607, which are hereby incorporated by reference. A rotary reader/writer mechanism is disclosed in application No. 07/697,944, filed May 9, 1991, also incorporated herein. Each of the foregoing exemplary reader/writer mechanisms are appropriate for a specific application where a variety of card thicknesses will not be encountered. However, to provide a more versatile system, the reader/writer mechanism should communicate with cards of a variety of thicknesses such that reconfiguration is not necessary to conform to a customer's needs. Therefore, a data card scanner like that which is disclosed in the application corresponding to Ser. No. 07/775,738 filed Oct. 11, 1991, assigned to the assignee hereof, which is incorporated herein by reference, is preferred. Other advantages of this scanner are that it uses advanced security measures to thwart fraud, it maintains the card within the system during the revalue process and it is compact. Additionally, this linear scanner provides a card swallow feature which swallows the cash card upon a determination of invalidity, damage or excessive wear.

Figure 3:
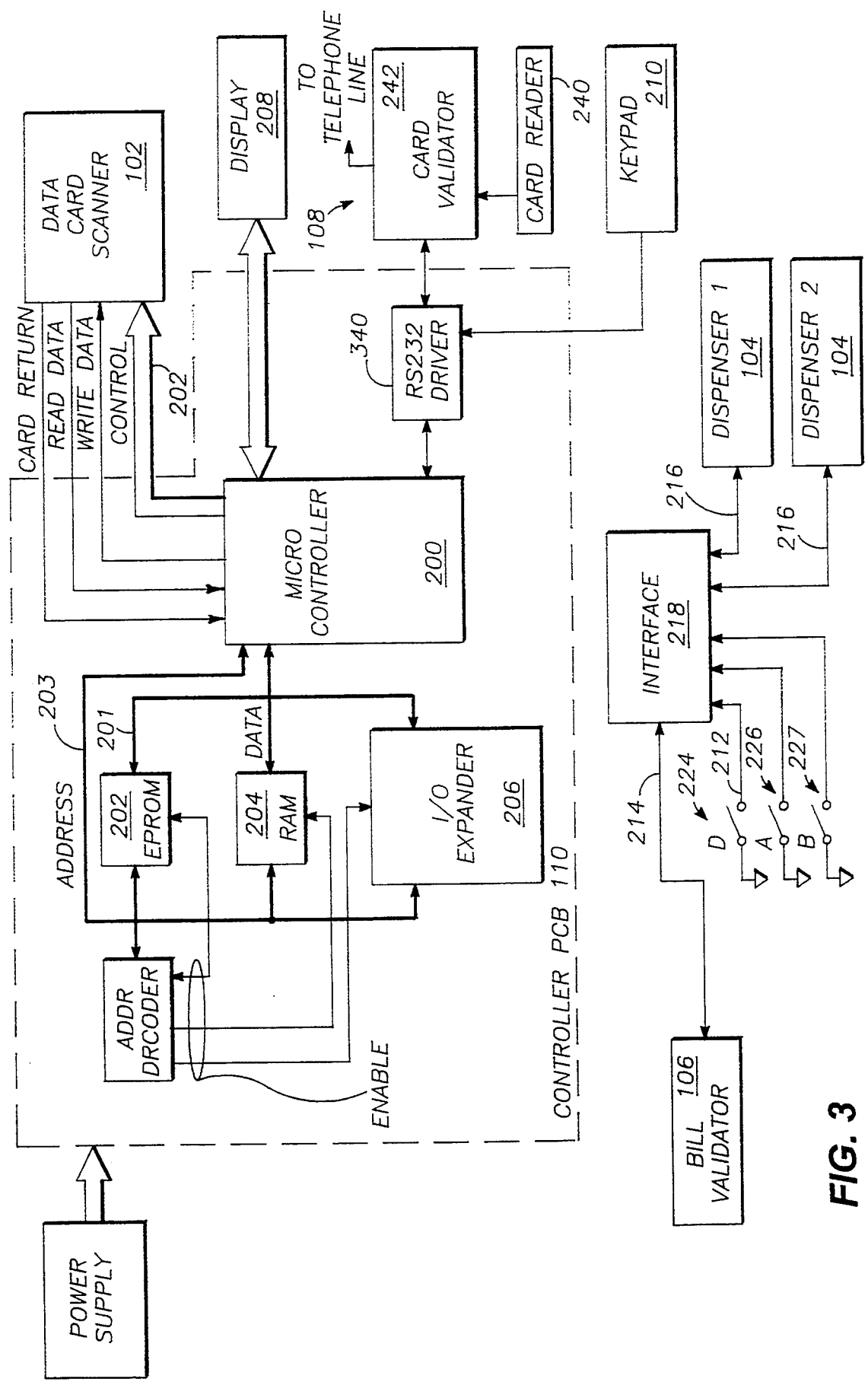
FIG. 3 is a detailed block diagram of the various interconnections within a controller printed circuit board in accordance with the invention.

As depicted in FIG. 3, the preferred linear scanner referred to above is controlled by a microcontroller integrated circuit 200 such as an M37450M2 manufactured by Mitsubishi, Inc. or an equivalent. It controls the data card positioning function, the data card scanning function, processes the read data and supplies the write data. The microcontroller 200 has an 8-bit bidirectional data bus 201, a 16-address bus 203, and 32 I/O ports. The control firmware is stored in a 32K external EPROM 202 additionally 8K of RAM 204 is supplied. To support the extensive number of external functions the microcontroller 200 executes and to provide sufficient I/O ports, in a preferred embodiment an I/O port expander integrated circuit 206 adds 24 extra I/O ports. Approximately 30 of the available ports are used by the scanner assembly 102 for general operations. The remainder are used to support the present invention.

The microcontroller 200 sends control and message information to the display circuitry 208. A two by sixteen character vacuum fluorescent display (Futaba 16-SY-03Z) driven by two twenty bit display driver chips (National Semiconductor MM58341) and a high voltage converter chip are sufficient to display system requests and information in a dispense and revalue application. Expanded display capabilities may be necessary if more complex messages are desired.

The microcontroller 200 is detachably connected to a keypad 210 which enables the system 100 owner or technicians to conduct diagnostics or configure system parameters. The diagnostic function enables a self test to be conducted via the disconnectable keypad 210, also referred to as a Handheld Initialization Terminal (HIT). The self-test executes such functions as memory diagnostics, display test, keypad test, motor test, transducer positioner assembly test, and cable connectivity tests. These tests are used for both field service diagnostics and manufacturing testing and diagnostics.

Via the keypad 210, various system parameters may be set, such as a site ID for accounting purposes, enable a card swallow function, select an interface type from a menu to correspond to a specific application, set a price table, set a clock, enable the security track reading circuitry, setting the writing density, adjusting timing and other parameters to conform to a particular application, among other functions. By providing the keypad for communicating with the microcontroller, the card scanner described may be uniquely tailored for each site installation.

Figure 4A:
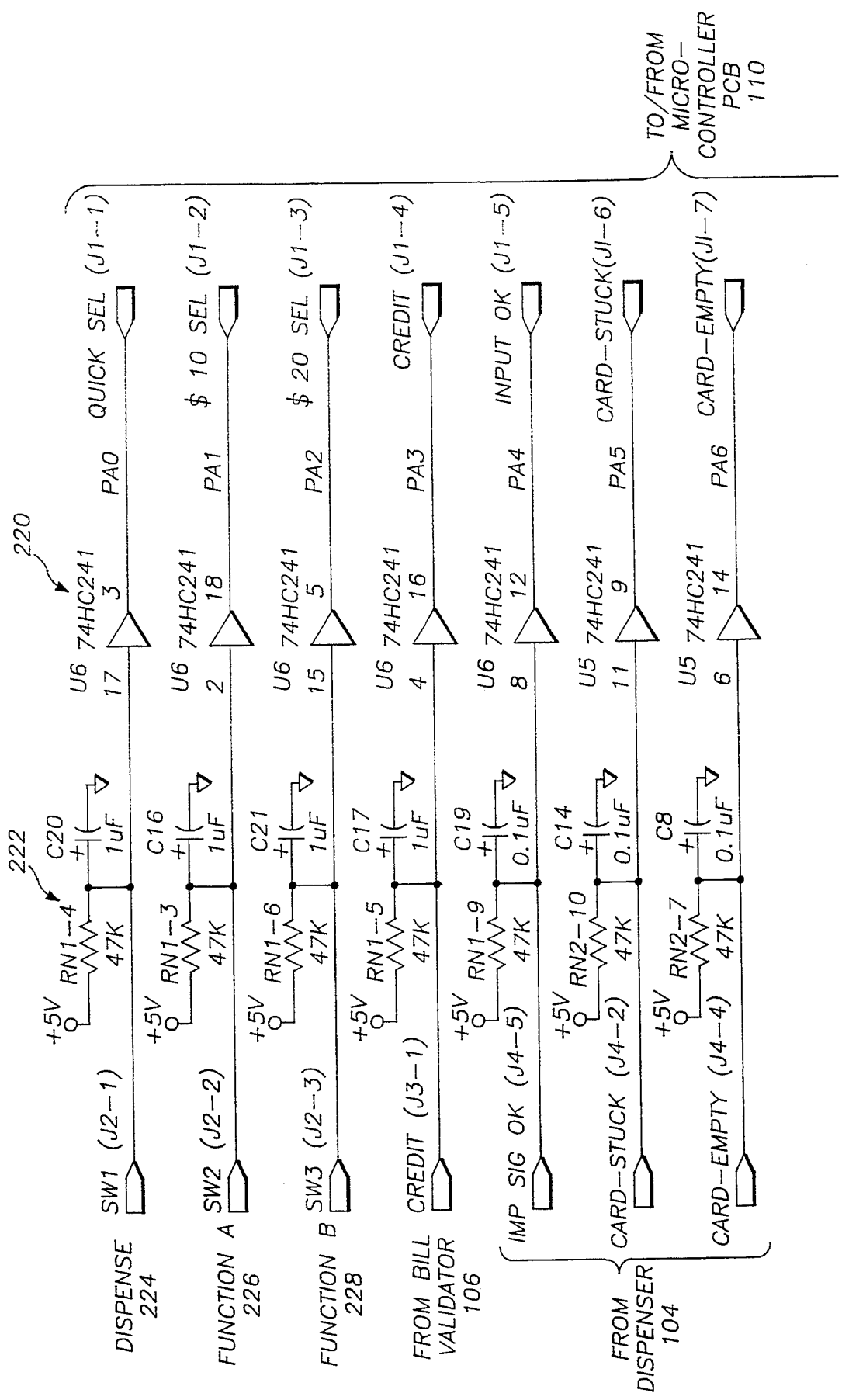
FIG. 4 is a schematic diagram of an interface circuit board in accordance with the invention.
Figure 4B:
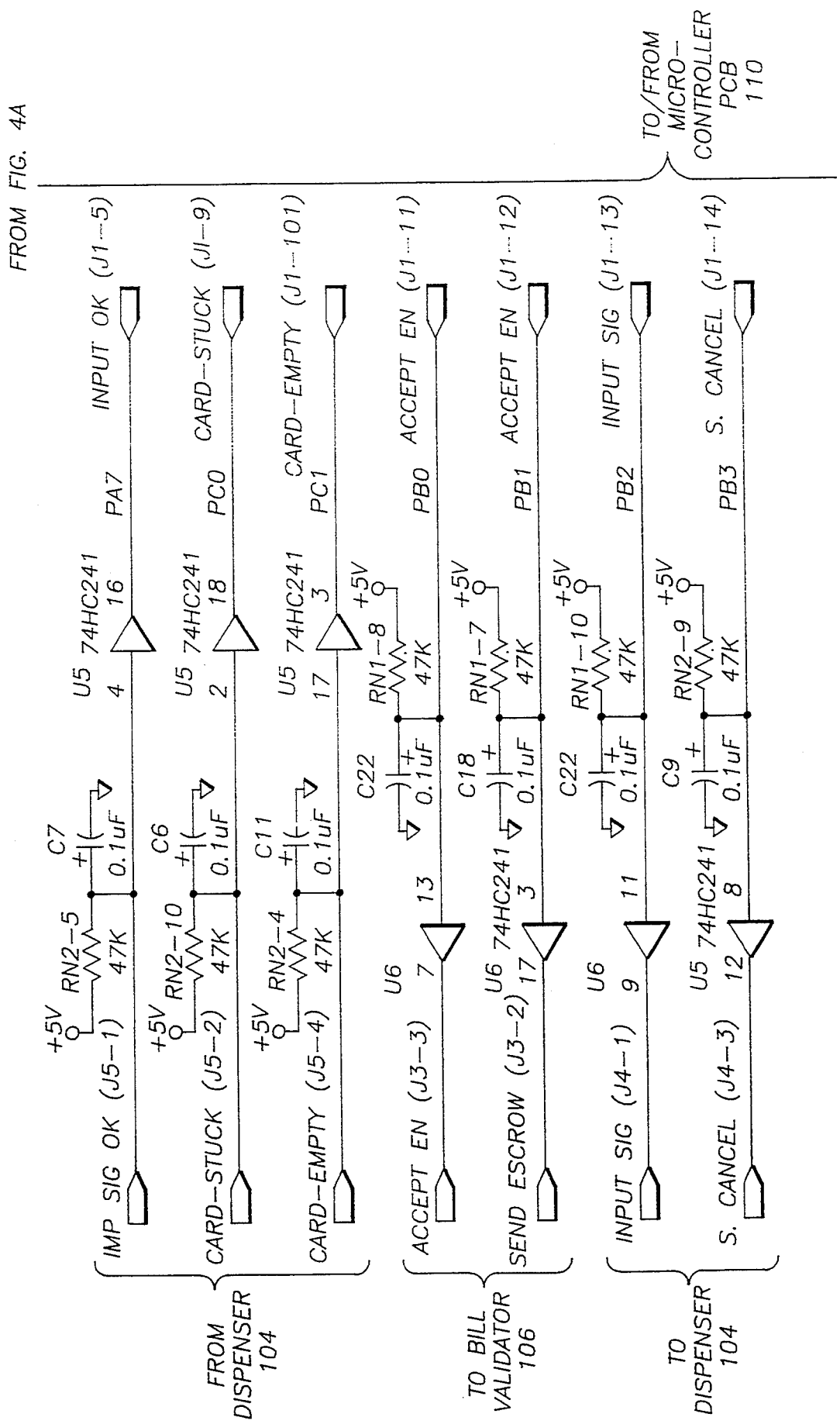
Figure 4C:
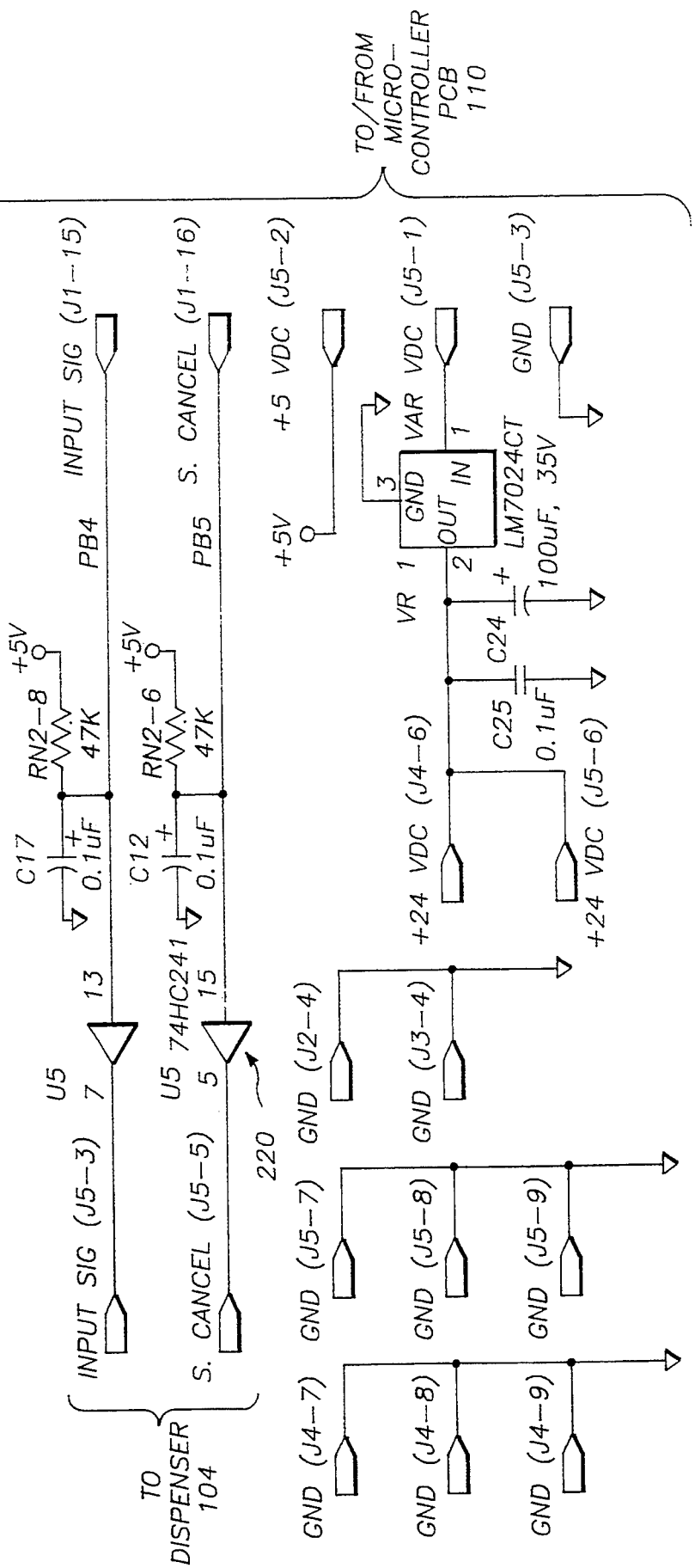

As depicted in FIG. 3, the dispense switch signal 212, some of the bill validator signals 21.4, and the dispenser control signals 216 pass through an interface circuit 218. A schematic of the interface circuitry is depicted in FIG. 4. The interface circuitry 218 has a buffer circuit 220 disposed serially in each signal line from and to the microcontroller 210. Additionally, a pull up resistor and filter capacitor combination 222 is provided for each line.

The dispense button 224 pulls the input line to ground when depressed, thus signaling the desire of a consumer to receive a card. The same can be said about the FUNC A and B switches 226, 227 used for credit card purchases discussed below. The digital signals from the dispensers 216 which pass through the interface circuitry 218 inform the microcontroller 200 when the dispense signal was received (INP SIG OK), when a card jam has occurred (CARD-STUCK), and when the cards are exhausted (CARD EMPTY). Additionally, the microcontroller 200 enables the dispensers 104 to dispense (INPUT SIG) and resets the dispensers after a problem, i.e. stuck card, is repaired (S.CANCEL). Via the interface 218, the bill validator 106 is enabled (ACCEPT ENABLE) and is instructed when to return escrowed cash (SEND ESCROW). Additionally, the bill value pulses are transmitted through the interface (CREDIT).

Figure 5A:
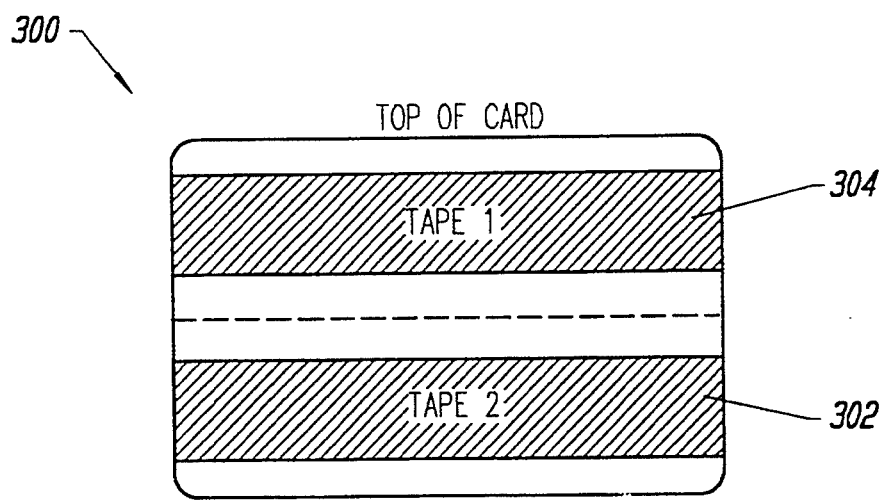
FIG. 5A and 5B are exemplary depictions of a cash card.
Figure 5B:
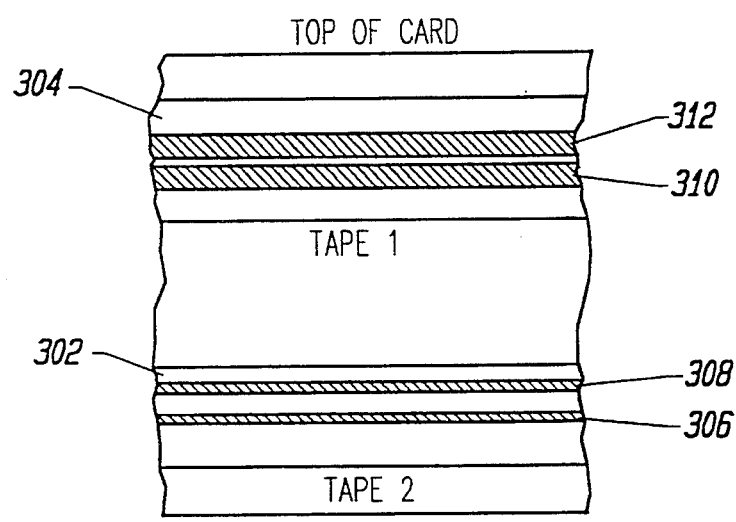

In operation, the linear scanner 102 accepts a cash card through an entrance slit 150 shown in FIG. 1. As depicted in FIG. 5, each card 300 generally includes a data stripe 302 having security information stored thereon and an information stripe 304 having the card value and card identification information stored thereon. Both tracks on the information stripe 304 contain data stored at any data rate which is necessary for a particular application. Typically, in a vending machine application, 105 bits/inch is used, but cards and readers Storing as many as 210 bits/inch are available. The linear scanner 102 incorporated herein by reference is capable of reading or writing any number of bits per inch merely by altering variables which are set within the system controller firmware; thus increased density with changes in technology can be accommodated.

In this example, the encoding technique used is two frequency, coherent phase encoding, also referred to as F2F encoding (although other formats are also usable). The information is stored as a pattern of flux reversals upon the data stripe. There are twice as many flux reversals for a logic ONE as there are for a logic ZERO over a fixed length of tape. For instance, a track which is written at 105 bits per inch with only ONEs would contain 210 flux reversals per inch. In comparison, a card written at the same speed with all ZEROs would contain 105 flux reversals per inch. This format conforms with the general format used to store data upon credit cards except credit card data is written at a standard of 75 bits per inch. The credit card standard is found in the American National Standard magnetic stripe encoding specification X4.16-1983 which is hereby incorporated by reference. That standard is available from the American National Standards Institute, Inc., 1430 Broadway, New York, N.Y. 10018.

It should be understood that the invention is not limited to data cards 300 having two magnetic stripes with two tracks each. The linear scanner 102 described above can be used, with obvious changes to the transducer arrangement and electronics that are within the skill of a person knowledgeable in this art, to communicate with any number of data stripes in combination with any number of data tracks.

The control circuitry 110 shown in FIG. 3 are specific to the present preferred embodiment of the card scanner in a revaluing environment using a particular form of card security which is available for license from Rand McNally Corporation and is generally disclosed in U.S. Pat. Nos. 4,837,426 and 4,906,988, the disclosures of which are hereby incorporated by reference. Other forms of card security could also be readily implemented in the overall system of this invention and would require some hardware and software alterations which are within the skill of the art to a person who is familiar with the disclosure herein.

The identification track 310 typically includes information which limits the scope of the card's use, e.g., a site restrictive code. For instance, a card 300 dispensed for factory cafeteria use is encoded with an ID which allows the card 300 to work at the cafeteria lunch counter, but not in a turnstile at the subway station.

The value track 312 information is both read by the scanner and written by the scanner. Thus, the card's initial value can be increased, i.e., revalued, using the invention.

In its simplest form, a system 100 for dispensing and revaluing a cash card 102 contains the above described components, i.e., data card scanner 102, bill validator 106, and cash card dispenser 104. However, to improve versatility and in accordance with another aspect of the invention, a credit card validation system 108 is used in conjunction with the previously described cash only system. The credit card validation system 108 is based upon known technology. A number of manufactures supply automatic credit card scanning and processing apparatus. One such system is the TRANZ ™ 330 manufactured by Verifone, Inc. of Redwood City, Calif. A similar system is described in a patent by Chang et al., U.S. Pat. No. 5,019,696, issued May 28, 1991 which is hereby incorporated by reference.

The TRANZ ™ 330 as well as most other credit card validators must be slightly modified to function in the present invention. Typically, the card reader is an integral component of the card validator system; however, to function in the present invention, the card reading mechanism 240 must be separated from the data processor 242 to permit the card reader 240 to be mounted on the outside of a housing 100 enclosing the various mechanical elements of the invention as shown in FIG. 1.

The remote positioning of the card reader 240 permits the user to insert and retrieve their own credit card. The type of reader 240 can be varied according to need. Most simply a card swipe type of reader, as described in the above referenced Chang et al. '696 patent, is used. However, more advanced and more secure types of readers based upon the data card scanner technology discussed with respect to the cash card scanner assembly, such as fixed head linear scanners, and moving head linear scanners are useful. The only requirement is that the reader is able to accurately pick up the information stored on the credit card data stripe.

Figure 6:
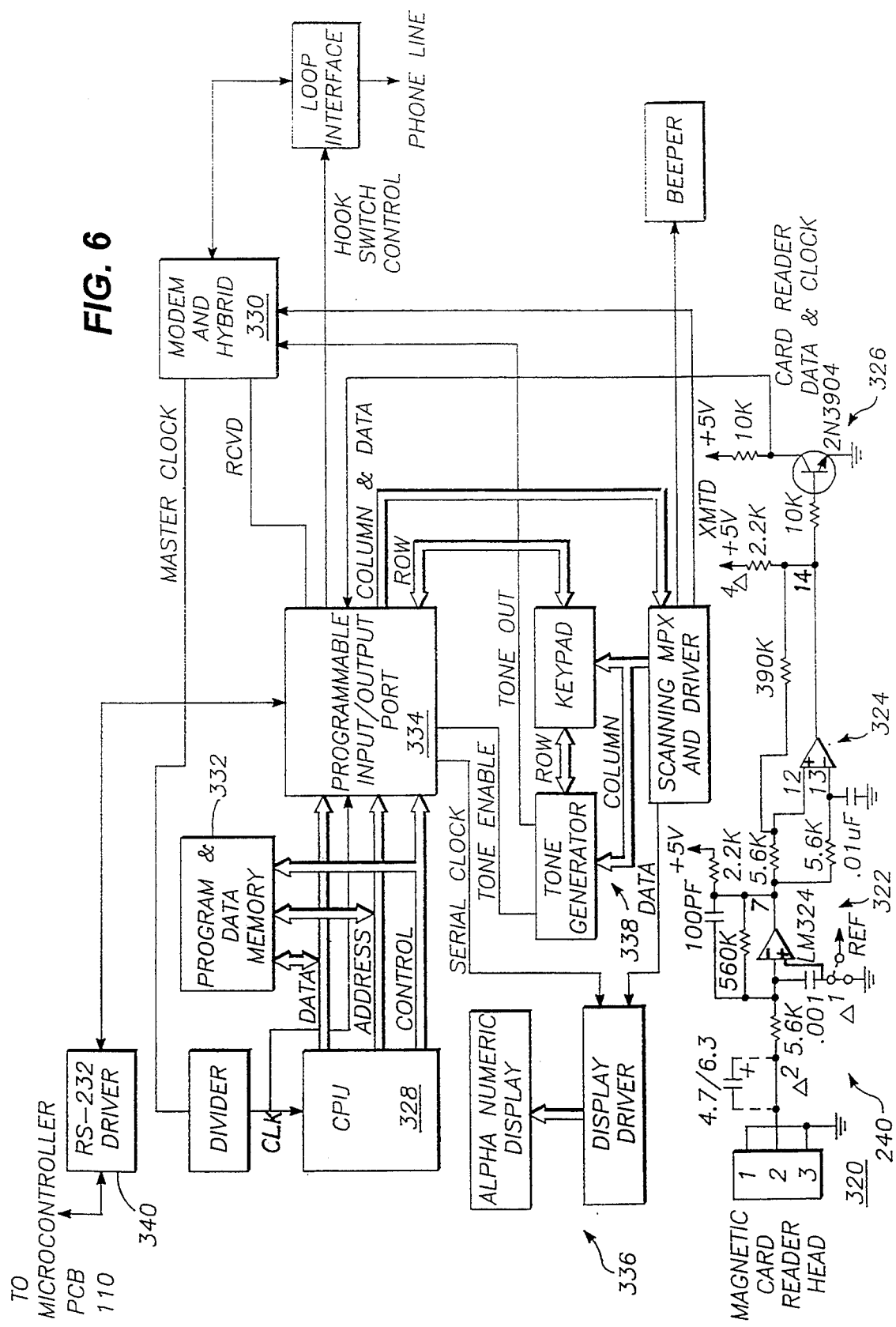
FIG. 6 is an exemplary block diagram of a credit card validator assembly in accordance with the invention.

An example of circuitry for reading the credit card data and conditioning the analog signal for the card validator circuitry is depicted in FIG. 6. The magnetic read head 320 is influenced by the magnetic flux transitions on the data stripe to produce a voltage. An amplifier 322, a voltage comparator 324, and a level shifter 326 convert the very low level voltage from the head 320 into a TTL compatible signal representative of the flux transitions on the data stripe. The TTL signal which has encoded in it the credit card number and expiration date is processed by the CPU 328.

In addition to apparatus 240 for reading the credit card, apparatus is provided to enable the consumer to request a value which they desire to be transferred onto their cash card 300 and charged to their credit card. The value is entered by depressing one of two value buttons, i.e., FUNCTION A and B, valued at $10 or $20, referred to in FIG. 2 as 226 and 227. The number of buttons could be increased to provide any assortment of values. Alternatively, a numeric keypad could be provided to enable the consumer to enter the desired value.

The reproduced credit card information is processed by the validator processing system 242 depicted in FIG. 6. In the exemplary TRANZ TM 330, this is a Z-80 CPU 328 which processes and decodes the card information, then validates the credit card by automatically dialing and communicating with a host computer (not shown) via an internal modem 330. The host computer will validate the card or reject it based upon a comparison with its database information and the amount of credit desired. To support the CPU 328, the card validator 242 includes data and program memory 332 consisting of ROM for storing the control firmware and RAM for short term memory storage. A programmable I/O port 334 drives a display 336 and accepts commands from a keypad assembly 338. The keypad 338 and display 336 are not accessible to the consumer, but are used for diagnostic and programming purposes.

Alternatively, a debit card can be read and validated in the same manner as a credit card. A front panel keypad must be added to the system to permit the customer to enter their personal identification number (PIN) to access their debit account. A PIN entry keypad such as Model 101 or 201 manufactured by Verifone, Inc. of Redwood City, Calif. or an equivalent keypad would be sufficient. Its standard encoded output signals are transmitted to the TRANZ TM 330 card validator 242. The desired cash value will be written to the value card 300 and the debit card (bank) account associated with the debit card used will be decreased appropriately through contact with the appropriate bank via the modem 330.

As depicted in FIG. 3 and 6, the card validator 242 and the microcontroller 200 of the data card scanner 102 are coupled together by an RS-232 interface 340. The firmware controlling each processor 200, 328 is task oriented such that each assembly sends and receives command packets which cause the assemblies to accomplish specific tasks. The data structure of the packets have the following form:

TABLE I

<STX> [TYPE] [PARA] [MSG1]
<FS> [MSG2] <ETX> {LRC}

| TYPE | FIELD | LENGTH | DESCRIPTION |
|---|---|---|---|
| <STX> | Start of Packet | 1 character | Value = 02 |
| [TYPE] | Packet Type | 4 characters | Alphanumeric Command Identifier |
| [PARA] | Packet Parameter | Variable | Alphanumeric Data Necessary to Perform Command |
| [MSG1] | Packet Parameter | Variable | Alphanumeric Message |
| <FS> | Field Separator | 1 character | Value = 1C |
| [MSG2] | Packet Parameter | Variable | Alphanumeric Message |
| <ETX> | End of Packet | 1 character | Value = 03 |
| {LRC} | Block Code Check | 1 character | Longitudinal redundancy code |

Subsequent processing utilizes the End of Packet and Start of Packet characters to determine the beginning and end of a command structure. The TYPE field executes a subroutine in the packet receiving system, i.e., card validator or microcontroller circuitry. The PARA field contains information necessary in executing the subroutine. Additionally, for some packets, alphanumeric messages are transferred for display. The number of message fields separated by field separator characters can vary from 1 to N, as necessary. For example, a packet relaying the validity of a credit card from the card validator 242 to the controller circuitry 110 contains an alphanumeric packet type indicator, such as TC03, followed by a parameter of ONE or ZERO to indicate either validity or invalidity of the credit card, respectively. The message fields will contain either an "INVALID CARD" or "CREDIT APPROVED" character strings. Which message is displayed depends upon the PARA field information. Lastly, a longitudinal redundancy code is checked for accuracy before the packet is used by the receiving system.

By way of example, the packets will cause the microcontroller 200 to display certain messages, enable and disable the bill validator 106 and card dispensers 104, and read and write data to a cash card via the card scanner assembly 102. Additionally, the card validator 242 can be made to enable and disable the credit card reader 240, dial the host computer via the modem 330, and store transaction data in memory 332. Packets are also used to transfer information such as credit card numbers, card values, desired credit value, etc. between the CPUs 328, 200. Note that packets are transferred bidirectionally on the RS-232 link between the card validator 242 and the microcontroller 200.

A special feature of the TRANZ TM 330 or an equivalent style system is that it accumulates transaction data in a buffer over long periods of time, i.e., typically the information is removed once per day.. A record of each transaction accomplished by the system 100 is transmitted via the RS-232 link 340 to the TRANZ TM unit 242 for storage. Subsequently, a host computer can call the TRANZ TM modem 330 and retrieve the transaction data for analysis. During this data retrieval period, a lock-out signal is sent via the RS-232 link to the controller 110 to reject all new transactions. The buffer is of finite length; consequently, once per day the buffer is transferred from its active storage area to an upload storage area to await recovery via modem or other means. If recovery is not accomplished, the new data is simply written over the old.

Typically, each prevalued dispensable card 300 is valued at $1.00. Therefore, a card request and insertion of a dollar bill are necessary to receive a cash card 300. Value can then be added to the card 200 via the cash card revaluing process described below. However, a number of card dispensers 104 can be installed in a parallel manner and have each dispenser 104 store prevalued cards of various values. A consumer request for a card 300 and insertion of an amount of currency equivalent to a card's prevalue causes dispensing of an appropriately valued card. For instance, dispensers for $1, $5, and $10 cards are accessible by requesting a card and inserting a $5 bill into the bill validator 106 to receive a $5 card.

It is foreseeable that prevalued cards 300 could be purchased by credit or debit cards. The process for checking card validity and receiving transaction authorization prior to dispensing a card would be accomplished as described below in reference to revaluing a cash card using a credit or debit card as a means for payment.

Figure 7:
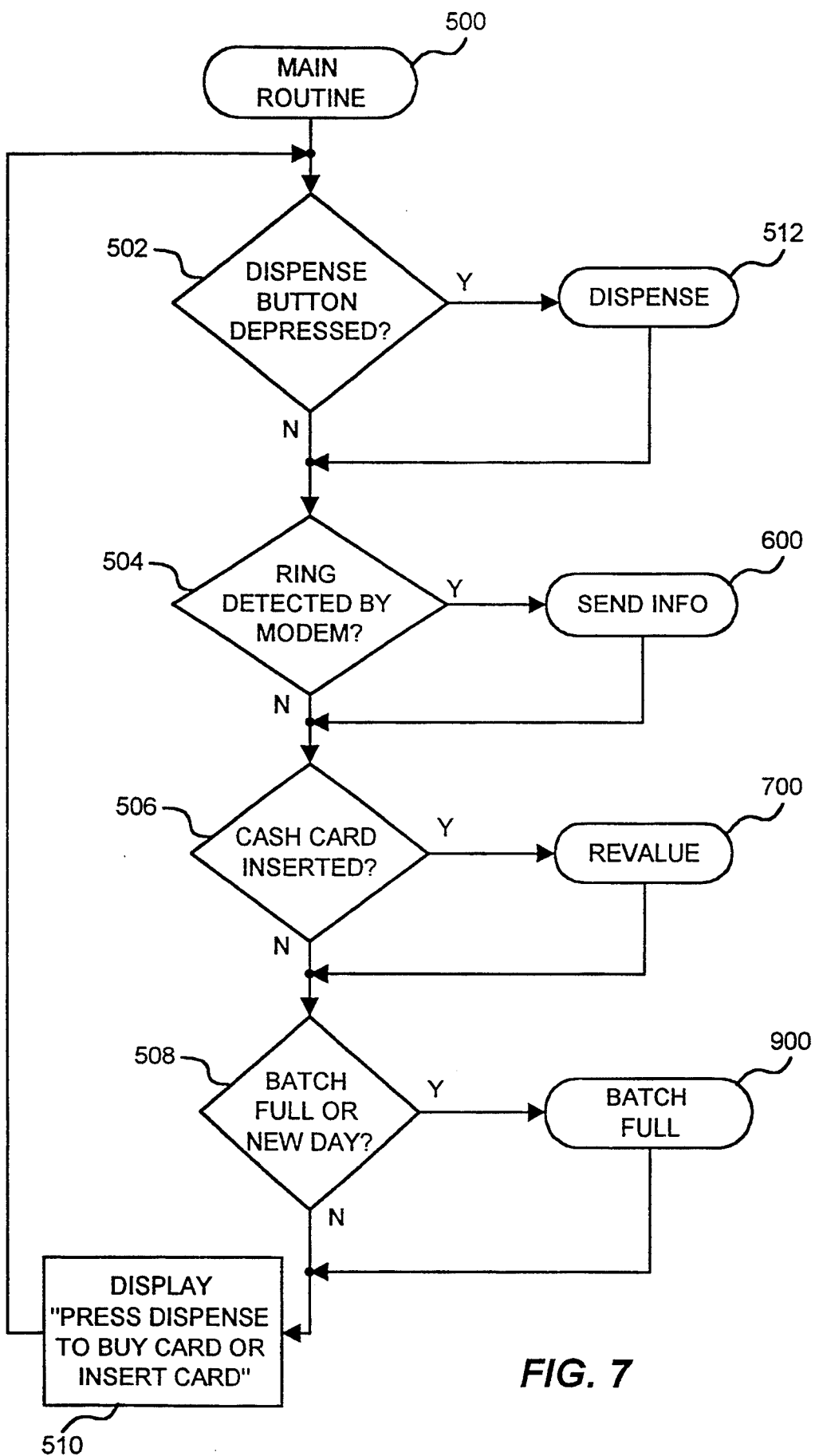
FIGS. 7–9, 10A–10D, 11 and 12 are flow charts of the operation of the preferred embodiment of the invention; abd

In operation, a main routine 500 depicted as a flow chart in FIG. 7 is stored in memory of the controller circuitry 110. The routine 500 repeatedly queries whether the dispense button has been depressed 502, whether an incoming call has been detected by the modem 504, whether a cash card has been inserted into the data card scanner 506, or whether the batch memory that stores the transaction information is full 508. During this query period the front panel display is repeating the message "PRESS DISPENSE TO BUY CARD OR INSERT CARD" at step 510. If any of the queries are answered affirmatively, the routine attached to the query is executed.

For the following example, the system 100 is configured as shown in FIG. 2. There are two dispensers 104 having $1.00 cards stored in both, a bill validator 106, a swipe-type credit card reader 240 capable of crediting $10 or $20, and a linear cash card reader 102.

Figure 8:
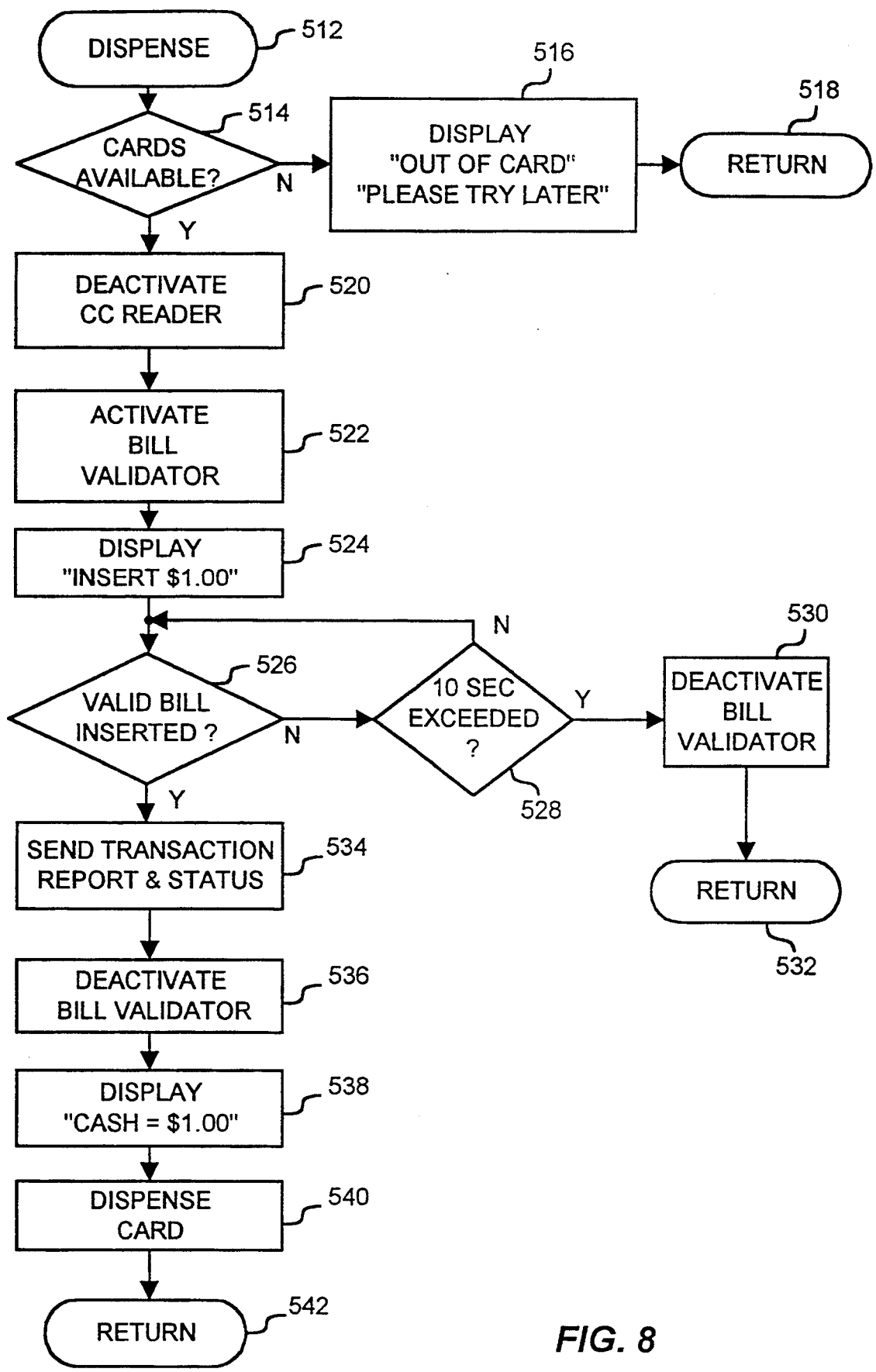
Figure 9:
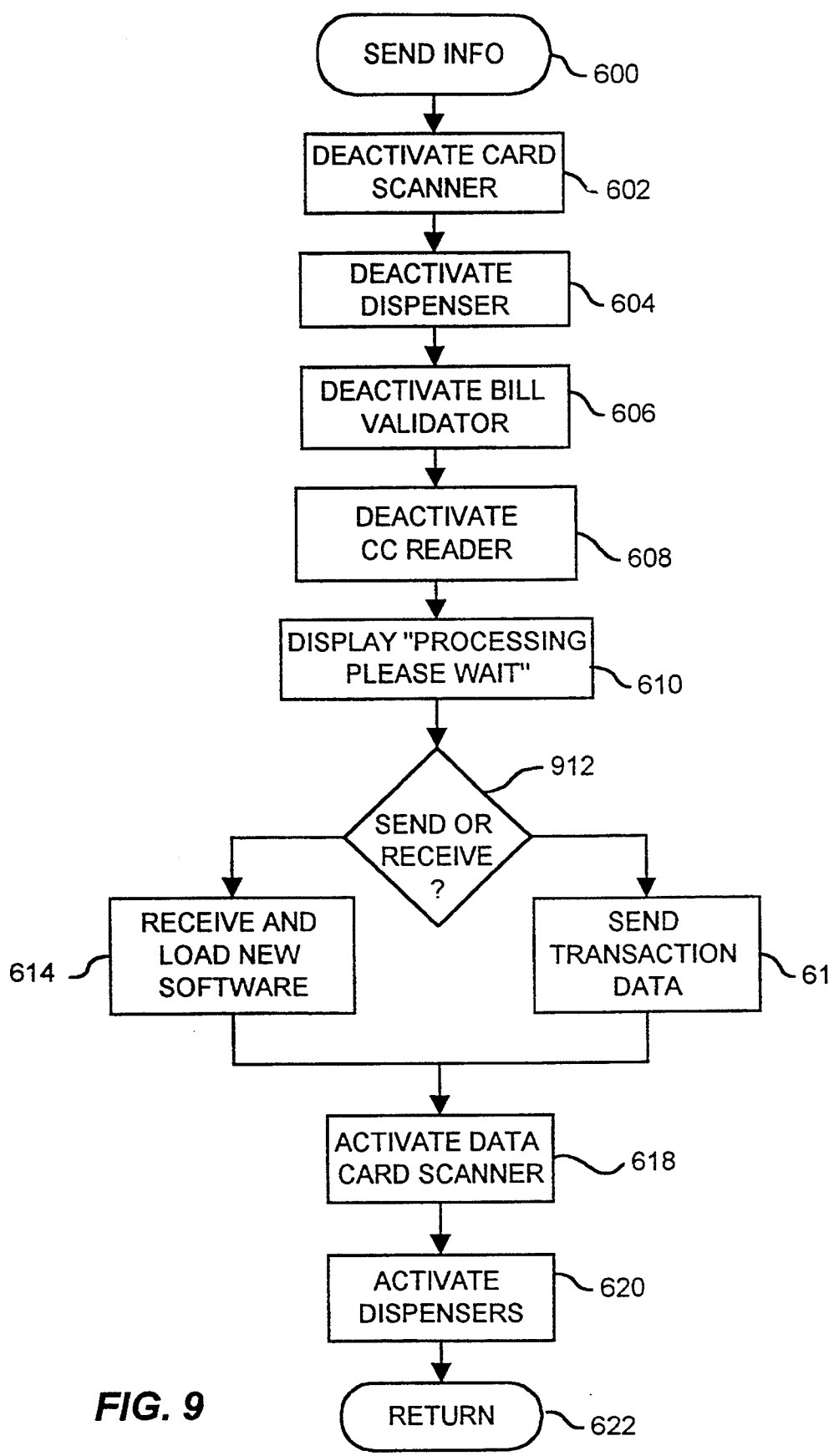
Figure 10A:
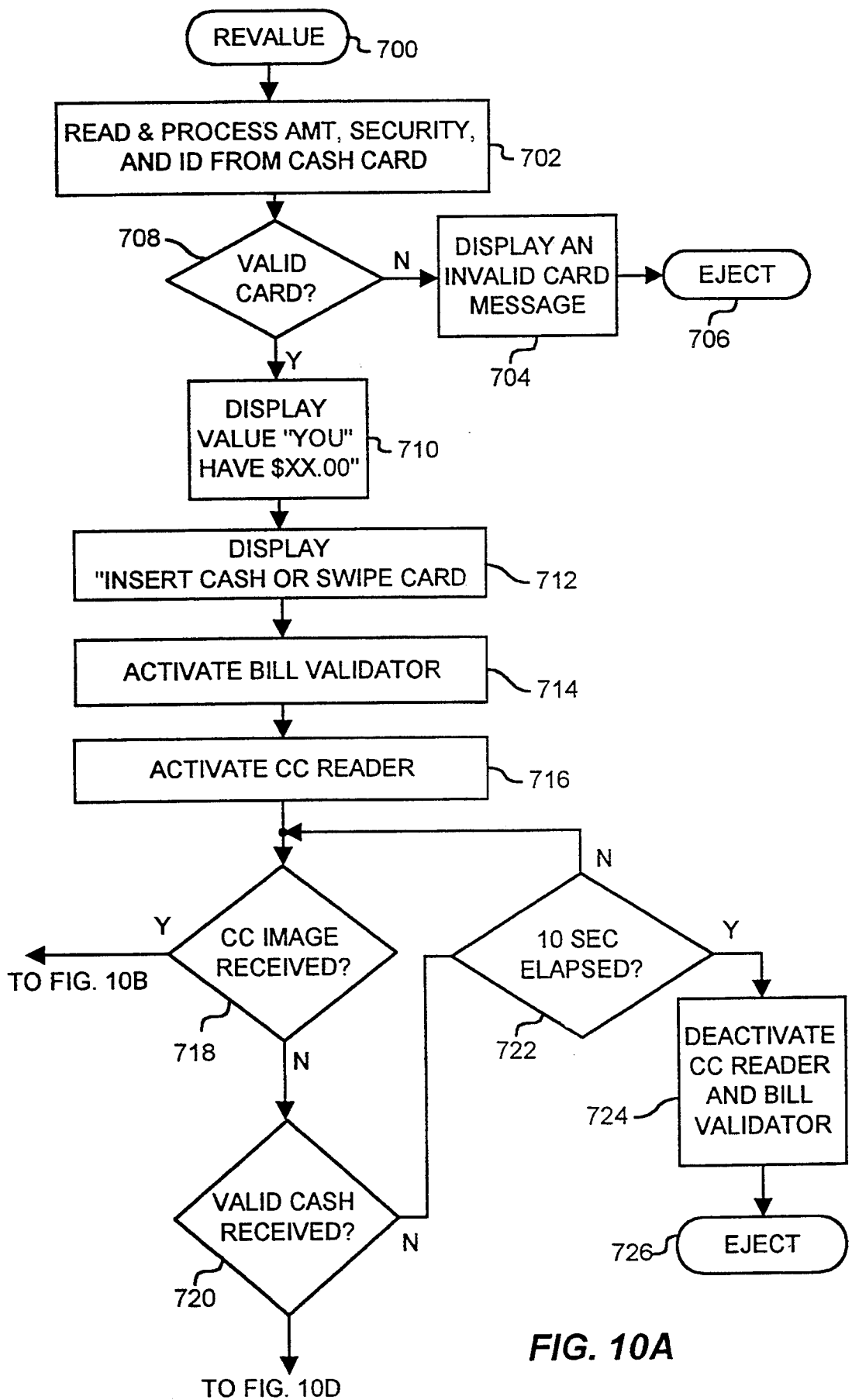
Figure 10B:
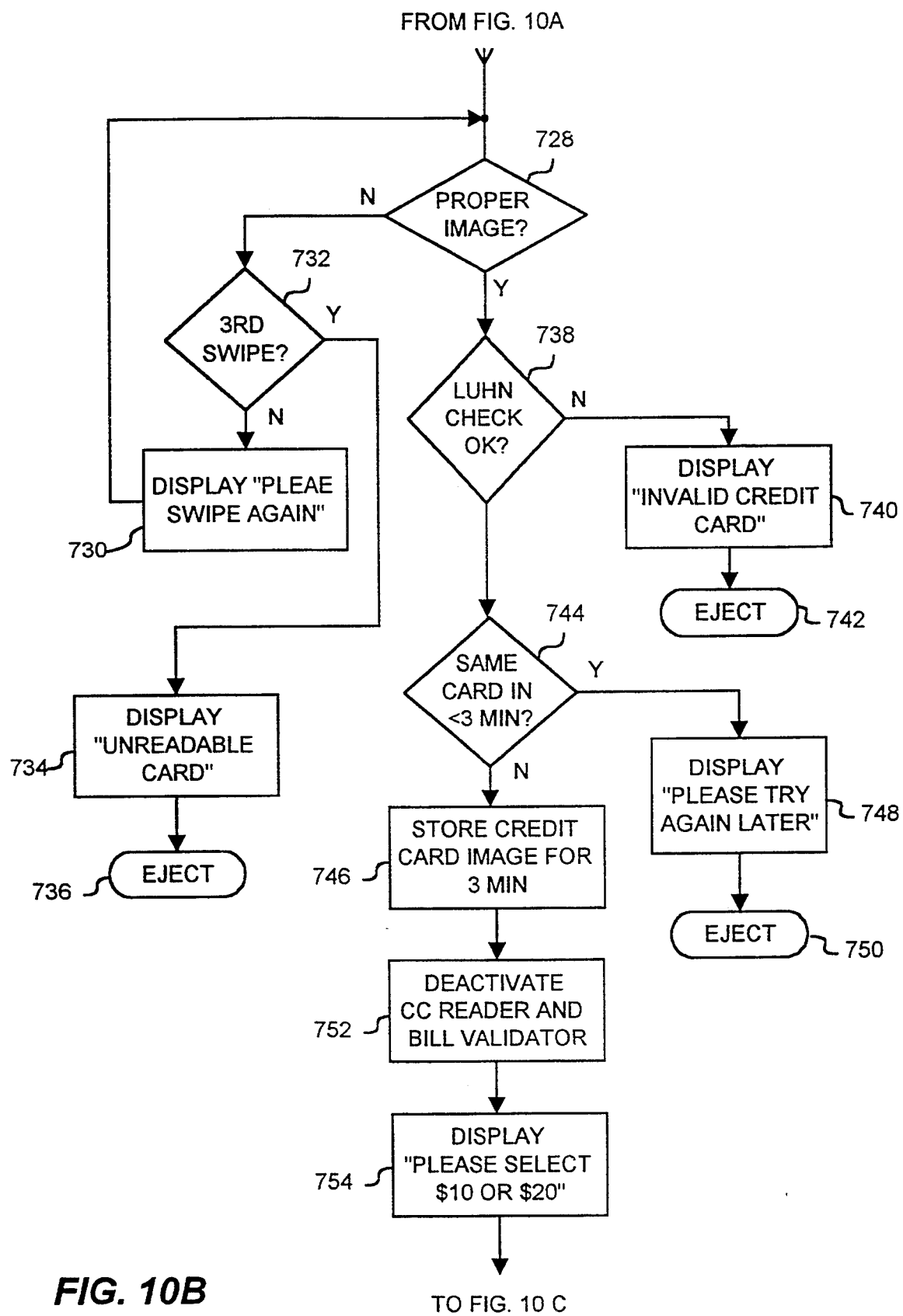
Figure 10:
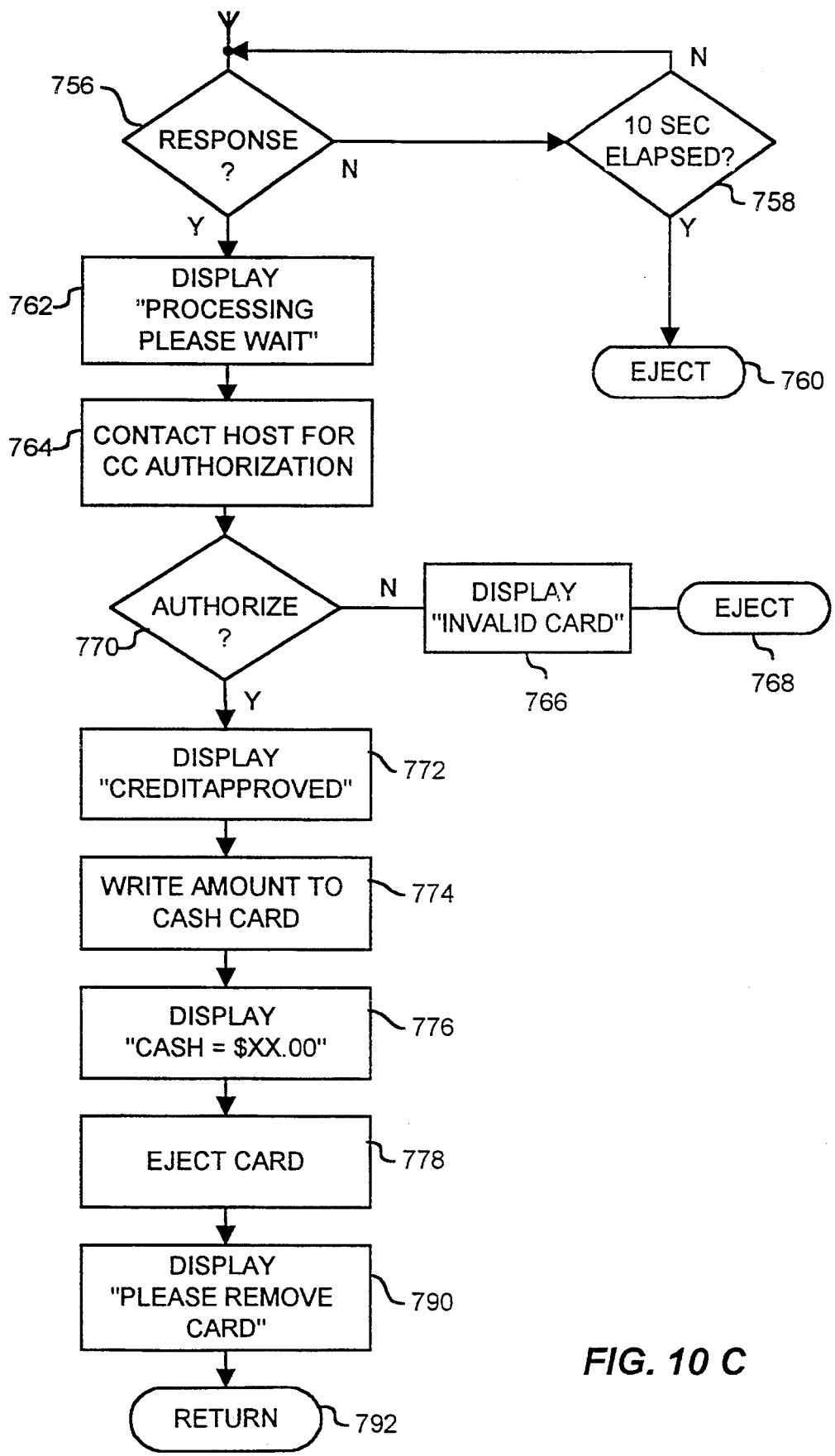
Figure 10:
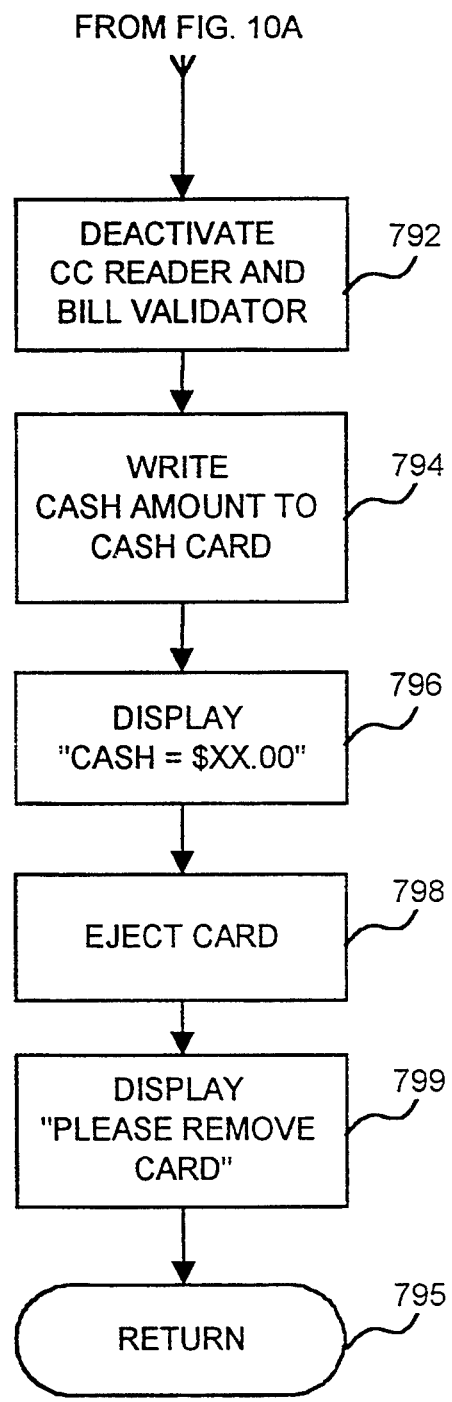

Assume the dispense button 224 is depressed. The DISPENSE routine 512 of FIG. 8 will be executed. The microcontroller 200 checks to see if cards are available, i.e., the CARD EMPTY flag is not set on either dispenser 104, at step 514. If both card storage racks are empty the system will display the message "OUT OF CARDS PLEASE TRY LATER" 516 and then return to the main routine 518.

If cards are available, a command is sent to the credit card validator to deactivate the credit card reader for security purposes 520. A subsequent signal is sent to activate the bill validator at step 522 and the message "INSERT $1.00" is displayed 524. The system waits 10 seconds for a valid bill to be inserted at steps 526 and 528 before the bill validator is deactivated 530. After deactivating the bill validator the system returns to the MAIN routine at step 532.

If a dollar bill is inserted and validated as such, the transaction report is sent to the credit card validator along with a status signal which indicates that the transaction is complete 534. Subsequently, the bill validator is deactivated 536, the display indicates the card's value 538, the card is dispensed 540, and finally the program returns to the MAIN routine 542.

It is foreseeable that the credit card validation routine described below could be used to purchase prevalued cards. However, practically speaking, $1.00 charges are not generally welcome by the credit card companies. The use of a credit card purchasing arrangement of prevalued cards becomes practical when the cards are valued at ten or more dollars.

Assume that a telephone line ring is detected by the credit card validator's modem at step 504 in the MAIN routine. Consequently, the SEND INFO routine is initiated 600. The credit card validator manages all of the telecommunications routines without interaction from the rest of the system. However, the processor in the credit card validator can not be utilized by the revalue system while its performing the telecommunications function. Therefore, the dispense and revalue system must be deactivated during this period.

With the foregoing in mind, steps 602, 604, 606, and 608 deactivate the data card scanner, the card dispensers, the bill validator, and the credit card reader, respectively. The display shows the "PROCESSING PLEASE WAIT" message 610. After all the system functions are deactivated, the modem and credit card validator microprocessor begin communicating 612, 614, 616. Through the telecommunications link, the system can have new software installed or the system can forward the prerecorded transaction information from memory. Additionally, system diagnostics can be executed by the remote link to test the systems functionality.

After the telecommunications link is severed, the system reactivates the data card scanner 618 and the card dispensers 620. Finally, it returns to the MAIN routine 622. At each RETURN function, the microcontroller always informs the credit card validator CPU of the current status of the system by sending status information across the RS-232 link.

Assume that a cash card is inserted into the data card scanner at step 506 and the REVALUE routine 700 is executed. The cash card may be either a used card or a new card which was Just dispensed having a $1.00 value on it. In either case, the card security information, identification, and value, is read by the card scanner 702 and the microcontroller processes the information. If the card is invalid as determined by the microcontroller, an appropriate message is displayed 704 and the EJECT routine is initiated 706. The card can be invalid for having a value greater that $59.99 (or another arbitrary, large number) as well as having an improper ID or security code.

If the card is deemed valid at step 708, the current card value is displayed 710. Subsequently, the system prompts the consumer for payment by displaying the message "INSERT CASH OR SWIPE CARD" 712. Both the bill validator and credit card reader are activated 714, 716. A 10 second period is waited at steps 718, 720, 722 for either cash or credit to be used. If payment is not made in time, the bill validator and the credit card reader are both deactivated 724 and the EJECT routine (FIG. 12) is initiated 726.

However, if a credit card is swiped in the reader and an image is captured, the image is checked to see if it is accurate, i.e., correct number of bits, LRC correct, etc. 728. If an improper reading was detected, the consumer is requested to swipe the card again 730 until the third swipe is attempted 732. At that point a message stating "UNREADABLE CARD" is posted 734 and the EJECT routine is initiated 736.

If the swipe was found to be proper at step 728, the check sum, or Luhn check, is tested 738. This ensures that the card is a major credit card and/or does not have a damaged data stripe. If the check sum is not proper the "INVALID CREDIT CARD" message is displayed 740 and the EJECT routine is initiated 742.

At step 744, the credit card number is checked against a list of credit card numbers used in the last three minutes. Each valid credit card number is temporarily stored in a buffer for 3 minutes at step 746. If a match is determined, the display indicates "PLEASE TRY LATER" 748 and the EJECT routine is begun 750. The three minute waiting period between credit card uses is a banking industry standard.

At this point, the credit card has passed all the initial tests of validity. The credit card reader and bill validator are deactivated at step 752. The consumer is prompted to select either a $10 or $20 value 754. The system waits for a decision for 10 seconds 756, 758 before ejecting the card 760.

Once a decision is made, a "PROCESSING PLEASE WAIT" message is displayed 762 and the credit card validator telephones the appropriate host computer to receive authorization to accept the credit card 764. If the authorization is not achieved the "INVALID CARD" message is shown 766 and the EJECT routine is initiated 768. However, if the authorization is forthcoming at step 770, the display reads "CREDIT APPROVED" 772 and the requested credit value is added to the existing value of the cash card. The new value is written on the value track of the card 774. The new value is displayed 776 and the data card scanner is caused to eject the card 778. The consumer is prompted to remove the revalued card 790 and the system returns to the MAIN routine.

If, at step 720, valid cash is inserted into the bill validator, both the credit card reader and the bill validator are subsequently deactivated 794. The cash amount inserted is written to the cash card 794 and the new value is displayed 796. The cash card is expelled form the data card scanner 798 and the consumer is prompted to remove the card 799. The system returns to the MAIN routine thereafter 795.

Figure 11:
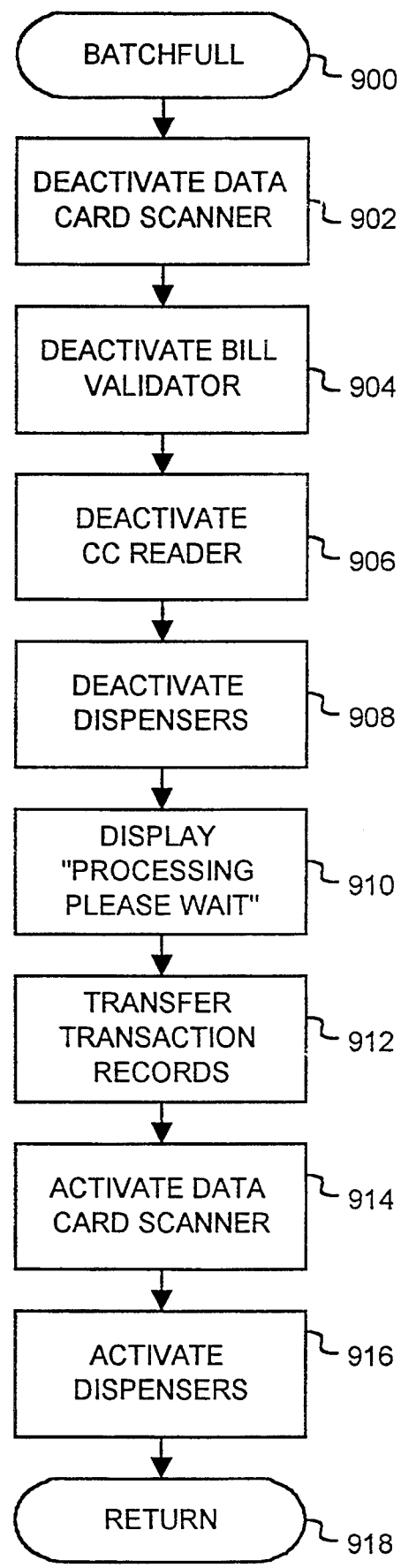

At the end of each transaction, the transaction record is sent to the credit card validator for storage in a special buffer. When this buffer becomes full, the data must be transferred to a new buffer to await retrieval by the host computer via the modem or some other means. Transfer is also accomplished at the start of each new period, typically at midnight of each day, whether the batch memory is full or not. The transfer process utilizes the CPU in the credit card validator and, like the SEND INFO routine, the system must be deactivated during the transfer process. Consequently, when the BATCH FULL flag is set, the MAIN routine 500 is halted at step 508 and the BATCH FULL routine 900 is executed at FIG. 11.

The system is I/O assemblies are deactivated at steps 902, 904, 906, and 908. The "PROCESSING PLEASE WAIT" message is displayed while the transfer is accomplished 910. Any data in the UPLOAD buffer is written over at step 912. However, if the SEND INFO routine was recently executed, the UPLOAD buffer should be empty. Once complete, the data card scanner and the dispensers are reactivated 914, 916 and the system reverts to the MAIN routine 918.

Figure 12:
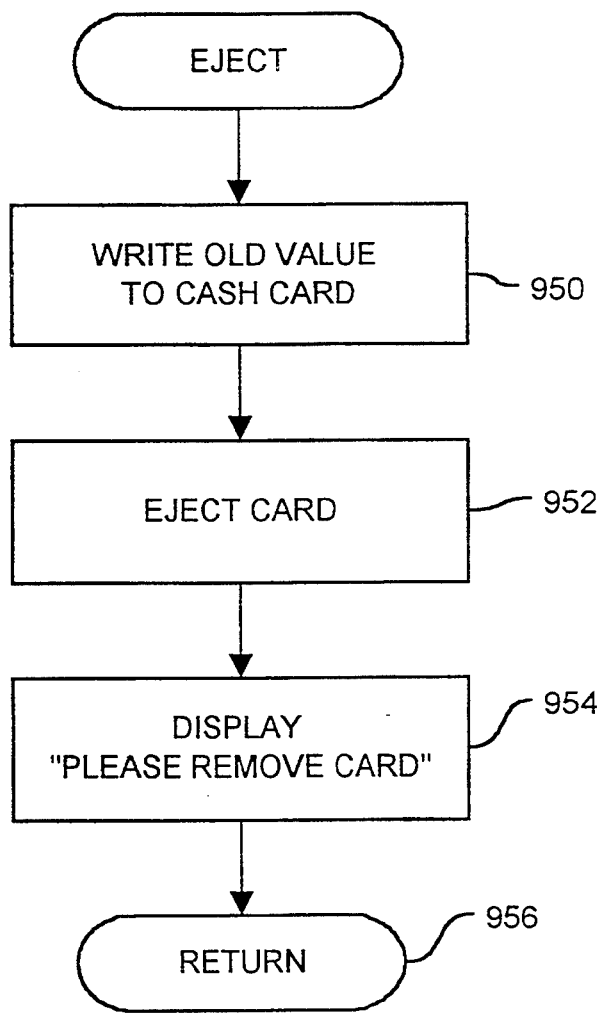

The EJECT routine is depicted in FIG. 12. This routine is only called when a cash card is to be ejected prior to a new value being available to be written thereon. Because the method of reading of some data card scanners removes the value information from the card during processing, the old value must be written to the card before it is ejected 950. The card is subsequently ejected 952 and the consumer is prompted to remove the card 954. The system then returns to the MAIN routine 956.

As an alternative or as a supplement to the credit card validation process, a debit card validation process can be added by adapting the firmware of the system to accomplish the additional tasks. A debit card is validated and authorized using essentially the same steps as described in connection with the credit card authorization process. Thus, adaptation is a duplicative process wherein, essentially the only variation is that a different telephone number is dialed for authorization and billing, and the consumer must enter an appropriate PIN via a front panel mounted keypad.

In summary and in reference to FIG. 1, the cash card dispensing and revaluing system 100 responds to a consumer request for a card 224 and the subsequent insertion of payment 106 by dispensing a prevalued card from the dispenser mechanism 104 having a value equivalent to the payment, usually $1.00. That card, or a previously purchased card, can be inserted in the data card scanner assembly 102 portion of the system to have its value increased. The mode of payment for the increased value can be either cash 106, credit 108, or debit 108. Payments by credit or debit are authorized by the internal credit/debit validation assembly 108 prior to the increased value being written to the cash card. Subsequent to revaluing, the cash card is expelled from the data card scanner assembly for the consumer's retrieval.

In the context of the present invention, the terms vending machine or dispensing machine are intended to equivalently mean any unattended point of sale of product and/or service, and are not intended to be restricted to traditional vending machine concepts. In this regard, the ten dispensing machine is used in preference to the ten vending machine to encompass the anticipated broader scope of unattended sales that may result from technological advances, including this invention.

Figure 13:
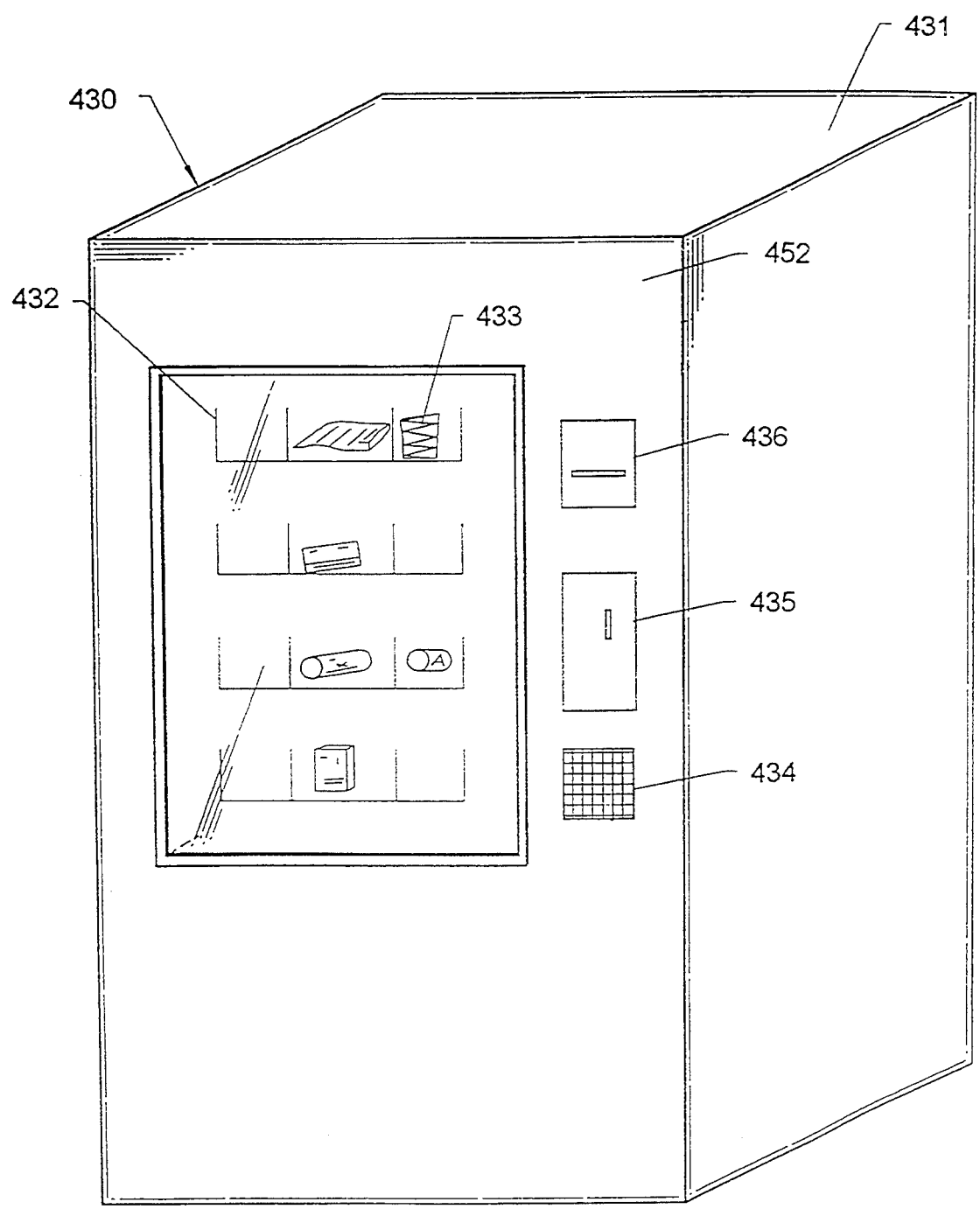
FIG. 13 is an illustrative drawing which shows an embodiment of a dispensing machine.

FIG. 13 is an illustrative drawing which shows an embodiment of a dispensing machine. This embodiment of a dispensing machine 430 comprises a machine housing 431, a product or service display area 432, including a plurality of product 433, a means for selecting product 434, a means for accepting coins 435, and a means for scanning a data card 436. The dispensing machine also comprises means for dispensing product, means for controlling dispensing, and means for interfacing which are generally internal to the dispensing machine housing 431 and are not shown in FIG. 13.

Means for selecting product 434 is conventionally some type of product selection apparatus 434 which the customer interacts with. Common examples are individual push buttons for each product, an alpha numeric keypad which associates an alphanumeric code with a product location, or some similar type of push button or touch-pad input device.

Means for accepting coins 435 is conventionally a coin acceptor device of which there are many types. An example of a common coin changer apparatus is the MC5 Coin Changer manufactured by Mars Electronics. The means for accepting coins such as a coin changer or the means for accepting bills (described below) provide a means for accepting cash payment. Both the coin acceptor and bill validator generate electrical signals indicative of the amount of cash accepted.

Means for dispensing product 437 is conventionally an electro-mechanical product dispensing apparatus which comprise devices such as motors, solenoids, or other mechanical actuators which respond to electronic signals. These product dispensing apparatus generally either move a product or allows a product to move from a storage location internal to the dispensing machine and present it to the customer. The electro-mechanical devices generally receive activating signals from the means for controlling dispensing 438. A common example of product dispensing apparatus are spiral lead screw type devices which rotate a certain number of turns under the control of an electric motor and move a product a linear distance to the end of a shelf associated with the lead screw, at which point the product is free to fall off of a storage shelf into a bin accessible to the customer. Another common example of such a product dispensing apparatus is a slidable or hinged access door wherein access is controlled by a solenoid type look. Another example is a dispensing machine wherein product is stacked, such a beverage cans, and an electrical signal allows one item to fall into an access bin where it may be retrieved by a customer.

Means for controlling dispensing 438 is conventionally a dispensing controller which may be implemented by simple switches and electromagnetic relays. These switches and relays may receive activating signals or activating power after product has been selected and sufficient payment has been received and supply the product dispensing apparatus 438 with activating power to actually dispense the product. The signals received by the dispensing controller 438 may be supplied directly by a coin change: 438 in some applications, by means for data card scanning 436, or from a means for interfacing 439 in a more sophisticated vending machine applications. The actual circuitry required by this dispensing controller is dependent on the application and may be as simple as electrical wires which conduct power to a motor or solenoid after an electronic switch or electromagnetic relay has opened or closed.

Means for scanning a data card 436 is conventionally a data card scanner apparatus and any required electronic interfaces, including firmware and software that may be required. The data card scanner apparatus 436 may generally be one of a number of types currently available on the commercial market, although not all will provide the same level of performance or enhanced features. Essential characteristics include transducers for detecting the data stored on the data card, at least one transducer for writing data to the data card, and an assembly for either scanning the card past the transducer or scanning the transducers past the card to accomplish the read and write functions. The transducers are conventionally of the type that transform electrical signals to magnetic fields or magnetic fields to electrical signals. Linear motion reader/writer mechanisms having fixed transducers are disclosed in patents by Pass, U.S. Pat. No. 3,386,753; Pfost et al., U.S. Pat. No. 4,020,325; and Redemacher, U.S. Pat. No. 4,879,607, which are hereby incorporated by reference. A rotary reader/writer mechanism is disclosed in U.S. patent application No. 07/679,944, filed May 9, 1991, also incorporated herein by reference. Each of the foregoing exemplary reader/writer mechanisms are appropriate for specific application where a variety of card thicknesses will not be encountered. However, to provide a more versatile system, the reader/writer mechanism should communicate with cards of a variety of thicknesses such that reconfiguration is not necessary to conform to a customer's needs. Therefore, a data card such as that which is disclosed in the application corresponding to Attorney Docket Number A55552/JAS, filed Oct. 11, 1991, assigned to the assignee hereof, which is incorporated by reference, is preferred. Other advantages of this scanner are that it uses advanced security measures to thwart fraud, it maintains the card within the system during the revolve process, and it is compact. Thee linear scanner also provides a card swallow feature which swallows the data card upon the determination of invalidity, damage, or excessive wear.

Means for interfacing 439 is conventionally an electrical interface which receives electrical signals from an apparatus such as a coin changer 435 or data card scanner 436, and processes the signals in an appropriate manner so as to present them to the vending machine dispensing circuitry, generally the dispensing controller 438, in a format that can be understood and deed by the dispensing controller 438 to carry out the intended functions, such as dispensing a particular product. Common examples of interfaces are electrical wires, optical communications links, interfaces that provide electrical buffering and amplification, and interfaces that perform logical operations on the received signals.

Figure 14:
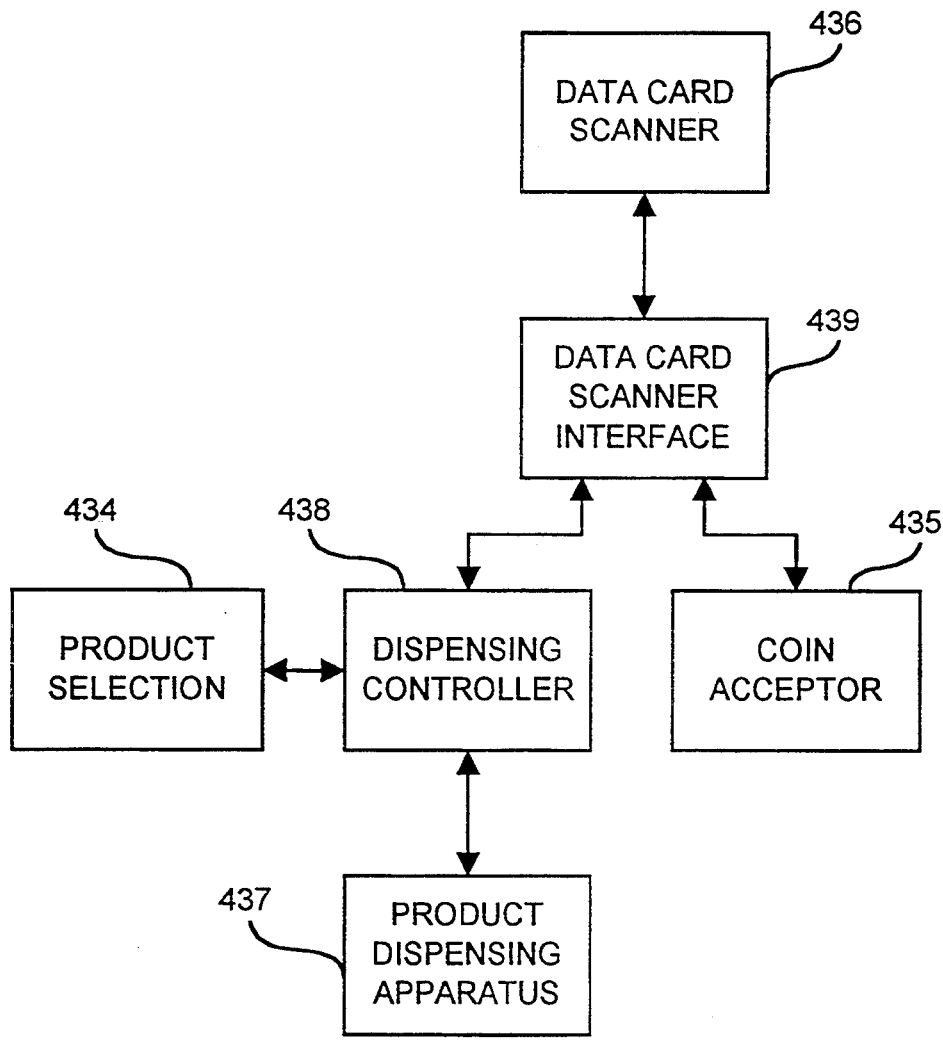
FIG. 14 is an illustrative drawing which shows a block diagram of an embodiment of a dispensing machine according to this invention as illustrated in FIG. 13.

FIG. 14 an illustrative drawing which shows a block diagram of the major vending machine elements and their relationship in an embodiment of a dispensing machine according to this invention as illustrated in FIG. 13. It diagrammatically illustrates a product selection apparatus 434, a coin acceptor 435, a data card scanner 436, a product dispensing apparatus 437, dispensing controller 438, and a scanner interface 439 and the connectivity between them.

In the embodiment of the invention illustrated in FIG. 13 and FIG. 14, the scanner interface 439 is interposed between a coin acceptor 435 and a dispensing controller 438 of the conventional configuration thereby replacing the direct connection between these elements in the conventional configuration.

Inclusion of a coin acceptor 435, a bill validator 441, and a data card scanner 436 including scanner interface 439 provides a very flexible multi-payment accepting dispensing machine.

Figure 15:
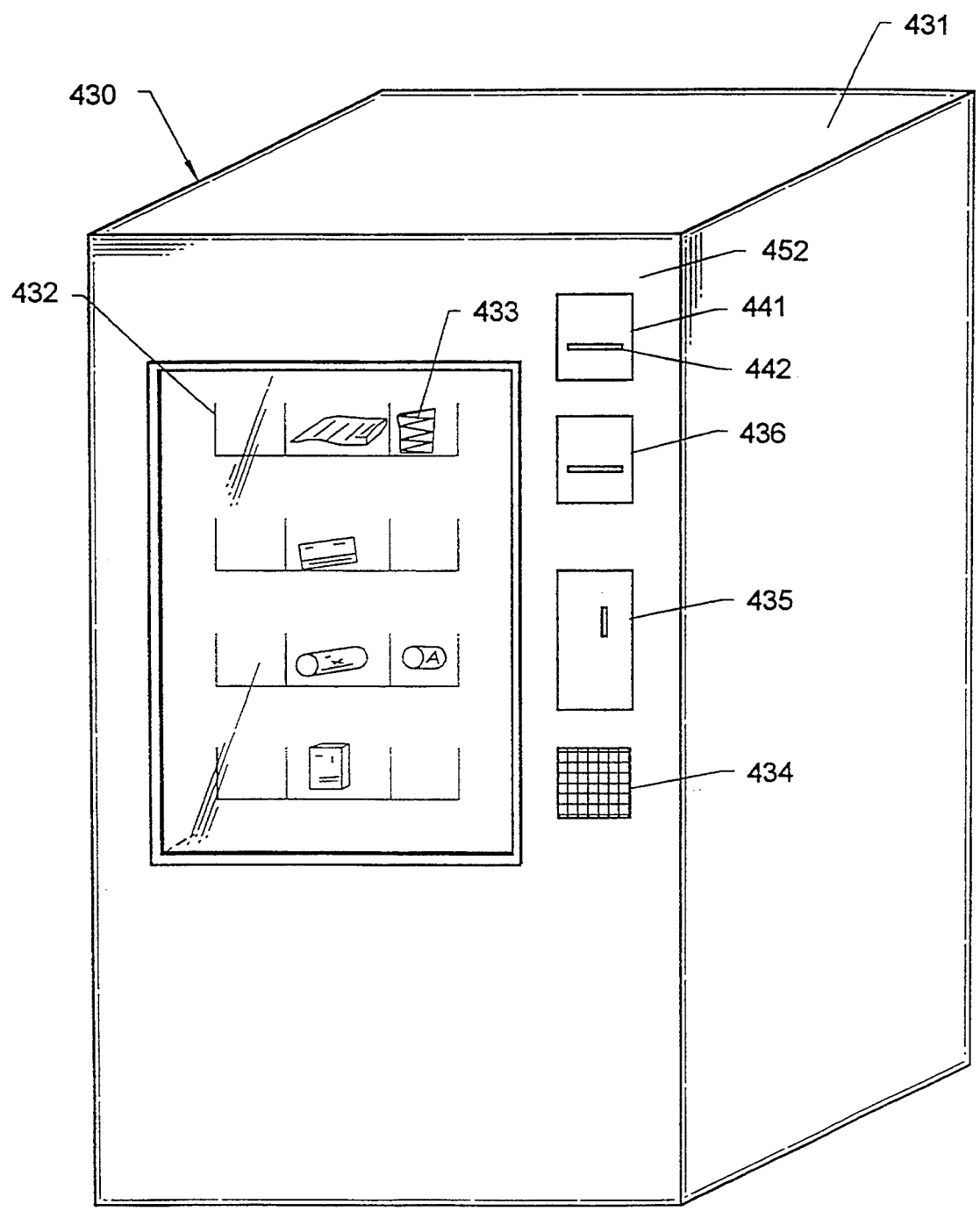
FIG. 15 is an illustrative that shows a dispensing machine similar to that shown in FIG. 14 with an additional element.

FIG. 15 is an illustrative drawing which shows a dispensing machine similar to that shown in FIG. 14 except for the addition of means for accepting a bill 441. Means for accepting a bill 441 is conventionally a bill validator, or bill acceptor apparatus one dominant bill validator model is manufactured by Rowe International, Incorporated of Grand Rapids, Mich. 49507. The Rowe Model CBA-4 is generally characteristic of the standard size, electrical interface characteristics, and mechanical mounting method for dispensing machine bill validators 441. The inclusion of a bill validator 441 somewhat changes the configuration of the elements but the operational principles remain substantially the same.

Figure 16:
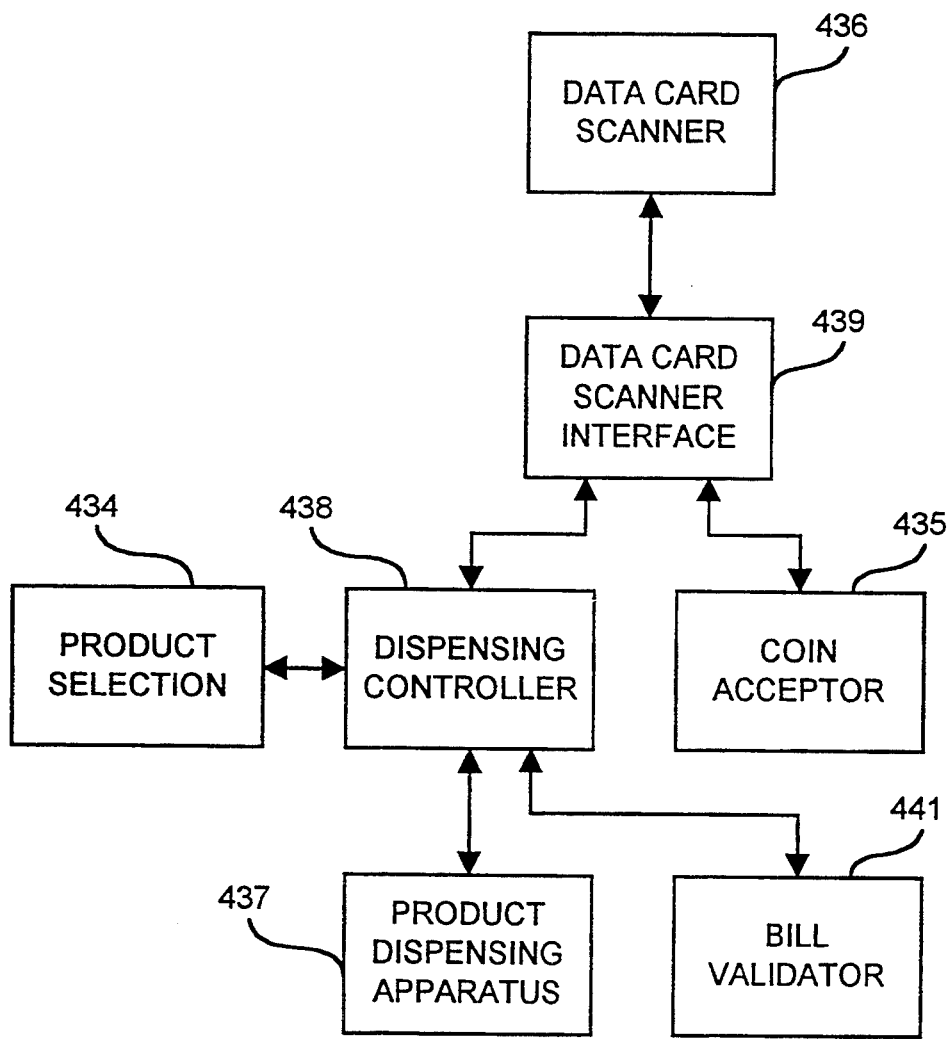
FIG. 16 is an illustration which shows a block diagram of the configuration of the elements of the embodiment illustrated in FIG. 15.

FIG. 16 is an illustration which shows a block diagram of the configuration of the elements of the embodiment illustrated in FIG. 15. The bill validator 441 is connected to dispensing controller 438. The other elements and their configuration may be substantially the same as in the embodiment of FIG. 14. It is also possible for the bill validator 441 to be connected to or through the coin acceptor 435 instead of directly to the dispensing controller 438.

Figure 17:
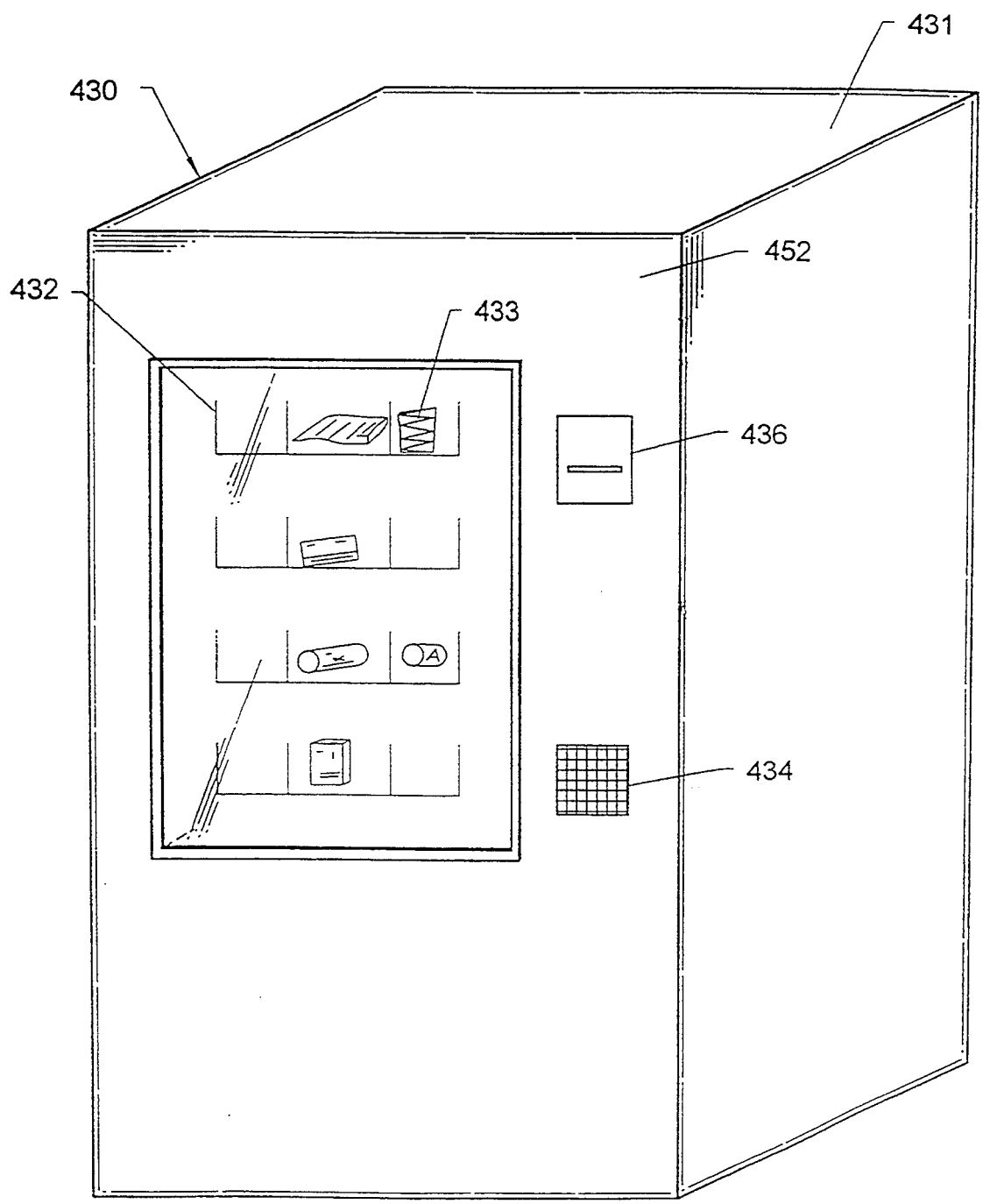
FIG. 17 is an illustration which shows an embodiment of the invention which includes neither a coin acceptor nor a bill validator.
Figure 18:
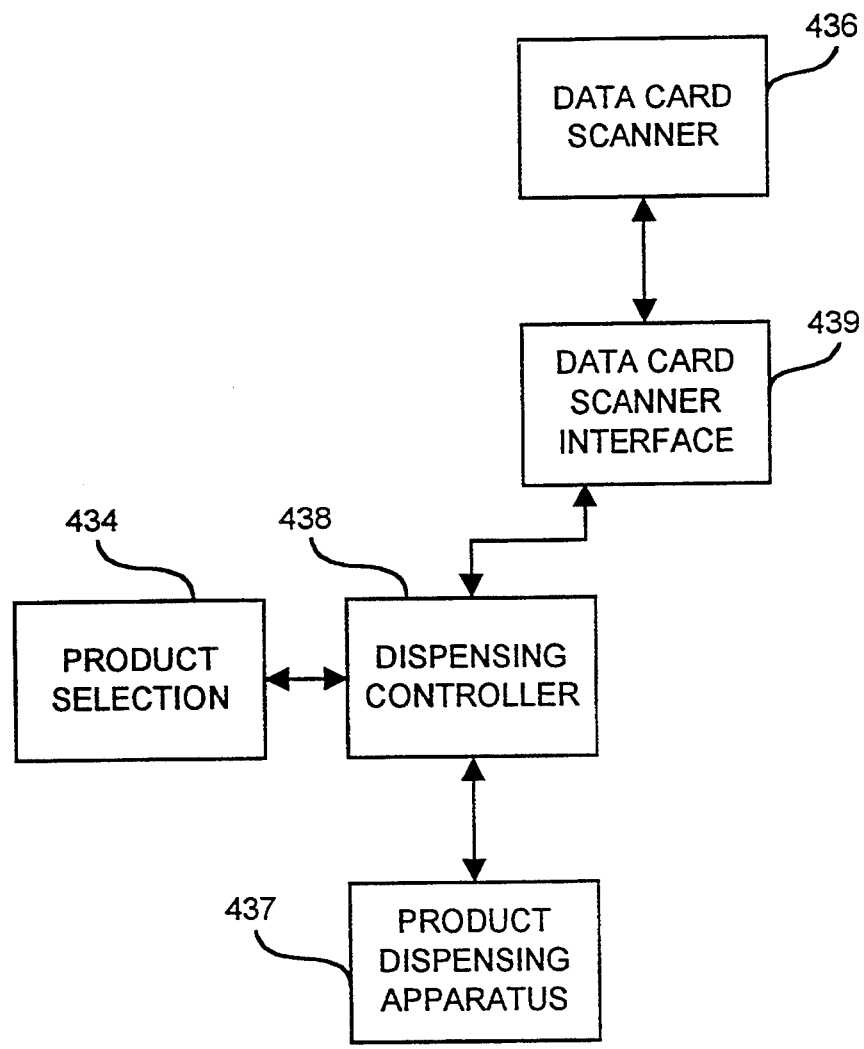
FIG. 18 is an illustration which shows the connectivity of the elements of the embodiment of the invention shown in FIG. 17.

The dispensing machine elements and their connectivity are illustrative of a possible method of connection. Other elements may be added, and the connectivity altered without departing from the scope of the invention. Some elements may also be removed without making the system inoperable. For example, the bill validator 441 and/or the coin acceptor 435 may be eliminated from the dispensing machine system without effecting the operability of the vending machine through the data card scanner 436. Such operation may be desirable if a cash free installation is desired or represent an operable resulting configuration in the event of a failure of either the bill validator 441 or coin acceptor 435. FIG. 17 is an illustration which shows an embodiment of the invention which includes neither a coin acceptor 435 nor a bill validator 441. The connectivity of the elements is illustrated in FIG. 18.

Figure 19:
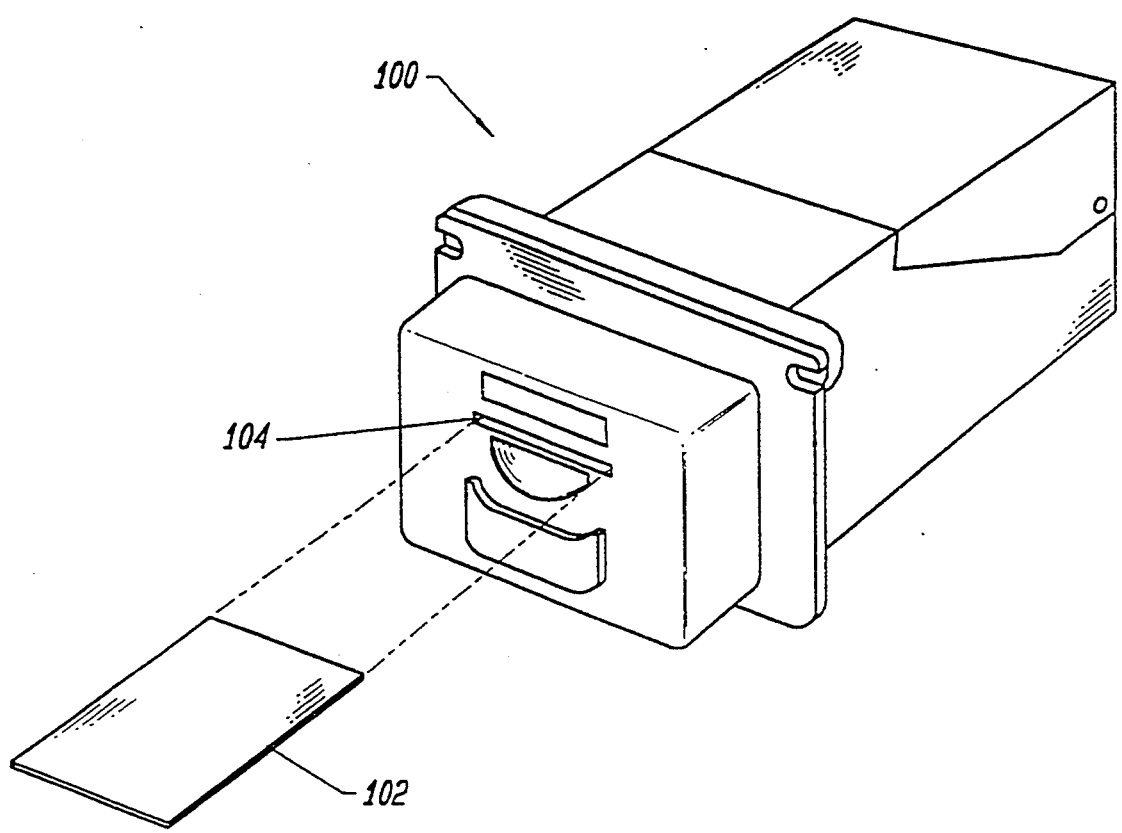
FIG. 19 is an isometric view of data card scanning apparatus in accordance with this invention.

Referring to FIG. 19, a linear scanner apparatus 100 in accordance with this invention is adapted for reading and writing data from/to a data card 102. The scanner apparatus 100 accepts the data card 102 upon user insertion of the card 102 into entrance slit 104. The insertion of the card 102 triggers sensor apparatus which engages a mechanism that pulls the card through the entrance slit 104 and positions it within the mechanism for subsequent data reading and writing.

Figure 20A:
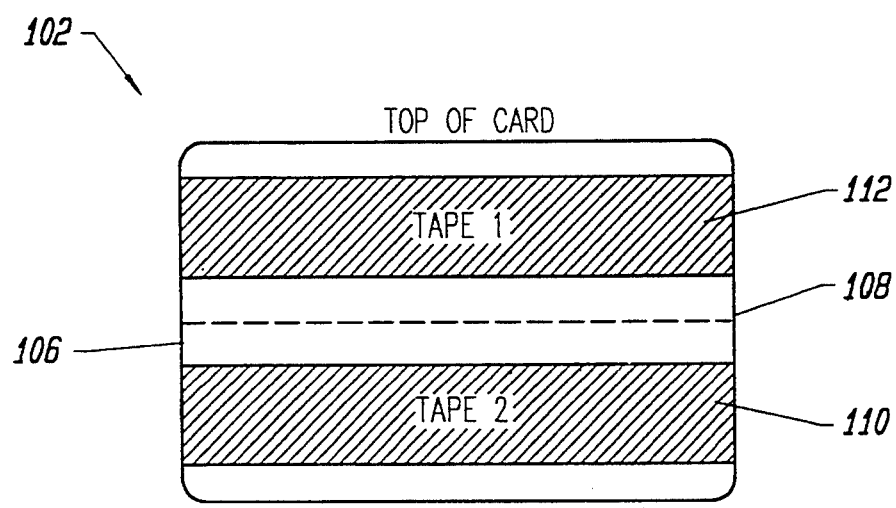
FIGS. 20A and 20B depict an exemplary data card having two data stripes.

Depicted in FIG. 20A is an exemplary data card formed from a thin, flexible medium, e.g, paper stock, plastic, mylar, etc. having leading 106 and trailing 108 edges. Generally, data cards vary in thickness between 8 and 40 mils depending upon the type of material used as base stock. However, the inventive concepts disclosed herein can be adapted by persons skilled in the art to accommodate date cards of any thickness. Data cards may vary in dimensions, but typically the cards are about the size of a credit or debit card, e.g., 3.375 by 2.125 inches.

Figure 20B:
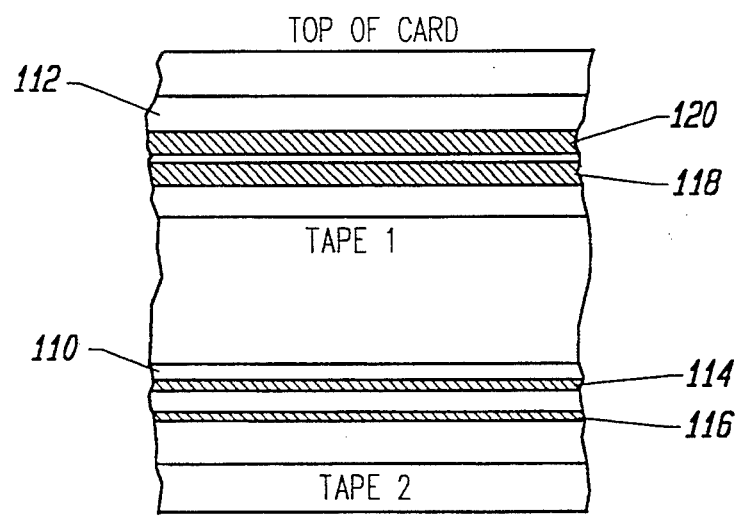

Between and perpendicular to card edges 104, 108 is disposed a pair of parallel magnetic data stripes or tapes 110, 112. Each stripe contains one or more data storage tracks. FIG. 20B depicts a card 102 having two stripes 110, 112 with two data tricks 114, 116, 118, 120 each. Typically, on a card which is used in a prepaid environment, i.e., for vending machine access, stripe 110 will contain security information in a form consistent with that which is available by license from Rand McNally corporation and is generally disclosed in U.S. Pat. Nos. 4,837,426 and 4,906,988, the disclosures of which are hereby incorporated by reference. Other forms of card security technology could also be readily implemented in the overall system of this invention.

In the vending machine application, stripe 112 will store card identification information on one track 120 and the card value is stored on the other track 118. Data stripe 112 contains data stored at any data rate which is necessary for a particular application. In a vending machine application, 105 bits/inch is used, but cards and readers storing as many as 210 bits/inch are available. Conceptually, the data card scanner disclosed herein is capable of writing any number of bits per inch by altering variables which are set within the system controller firmware. However, the hardware and firmware disclosed herein has a practical limit of approximately 210 bits/inch. Lesser bit rates are controlled by varying a variable in the firmware. Higher rates must be accommodated by making appropriate changes in the hardware and firmware which would be obvious to those skilled in the art.

It should be understood that the invention is not limited to data cards having two magnetic stripes with two tracks each. The linear scanner of the invention can be used, with changes to the transducer arrangement and electronics that are readily understood by those skilled in the art, to communicate with any number of data stripes in combination with any number of data tracks. Additionally, it is foreseeable that the inventive arrangement described below could be used to read optically encoded data on a data card, e.g., bar coded data.

Figure 21:
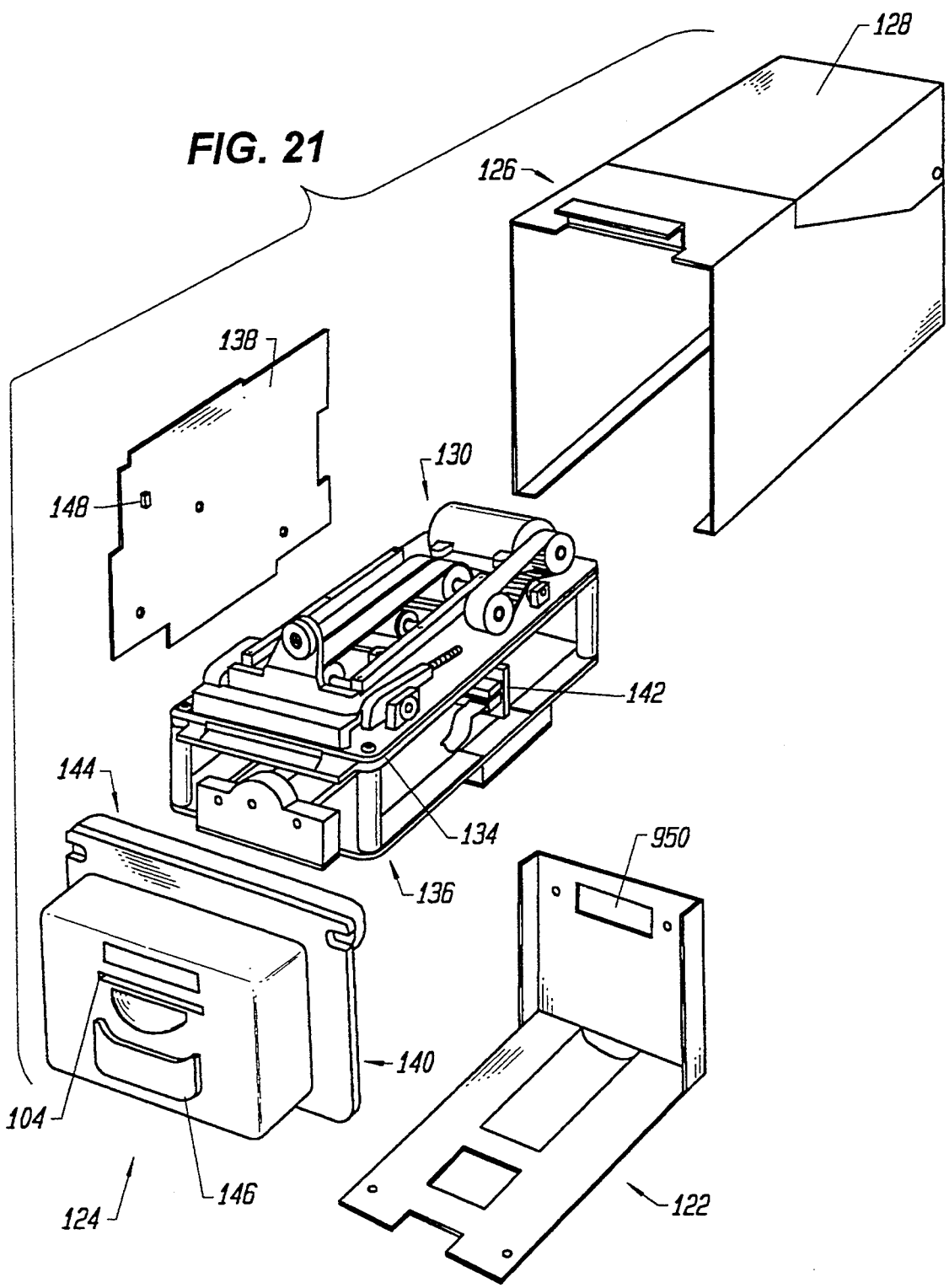
FIG. 21 is a partially exploded isometric view of FIG. 19.

The basic elements of a linear data card scanner in accordance with the invention are encased in a plastic and sheet metal housing as depicted in FIG. 19. The overall dimensions of the apparatus is approximately 6.4 by 3.42 by 8.22 (L, W, H) inches and weighs approximately 2 lbs., 11 oz. As depicted in FIG. 21, the housing consists of four basic elements; base and back plates 122, a front panel 124, a main housing 126, and a hinged access cover 128.

As depicted in FIG. 21, the basic assemblies of the linear data card scanner 100 include a data card positioning assembly 130 for driving the data card 102 through an entrance slit 104 and into a card guide 134 and for positioning the data card in a prearranged position within the card guide 134, a transducer positioning assembly 136 for scanning the transducers along the data card 102 in a linear fashion, a plurality of circuit boards containing system control electronics 138, 140, 142, a display electronics assembly 144, and a user accessible interrupt button assembly 146. In accordance with one aspect of the invention, to simplify manufacturing and maintain low production costs, a majority of the structural components of the foregoing assemblies are constructed of injection molded plastic.

Figure 22:
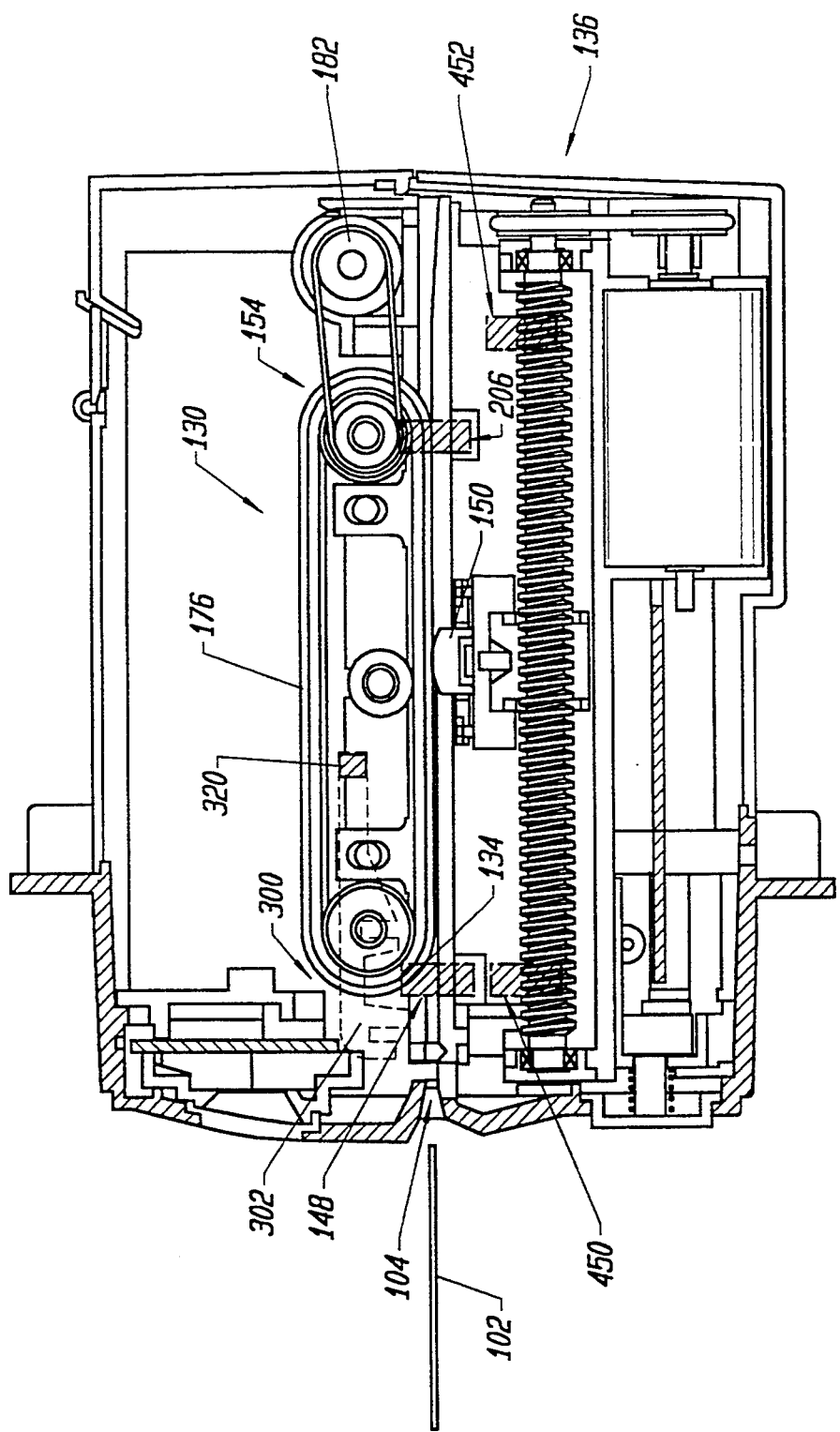
FIG. 22 is a cross-sectional view of a preferred embodiment of the invention depicted in FIG. 19.

In accordance with the general principals of operation of the invention and referring to FIG. 22, a data card 102 of any thickness between 8 and 40 mils is inserted into the entrance slit 104 and triggers a electro-optic sensor 148 that engages the card positioning assembly 130. The card 102 is drawn into a card guide 134 with a force of approximately 6 oz. and is positioned therein at a prearranged position. The transducer positioning assembly 136 scans transducers 150 in a linear fashion along the data stripes 110, 112 on the card 102. The data stored on the stripes 110, 112 is processed to determine the card's validity, identification and value. If the linear data card scanner 100 is used in a vending machine, the user's item selection is processed by the vending machine control system and the value of the item selected is deducted from the value currently stored on the data card 102. A new value is written on the card 102 and the card 102 is subsequently expelled from the entrance slit 104 by the card positioning assembly 130 such that the user may easily retrieve the card 102.

Figure 23:
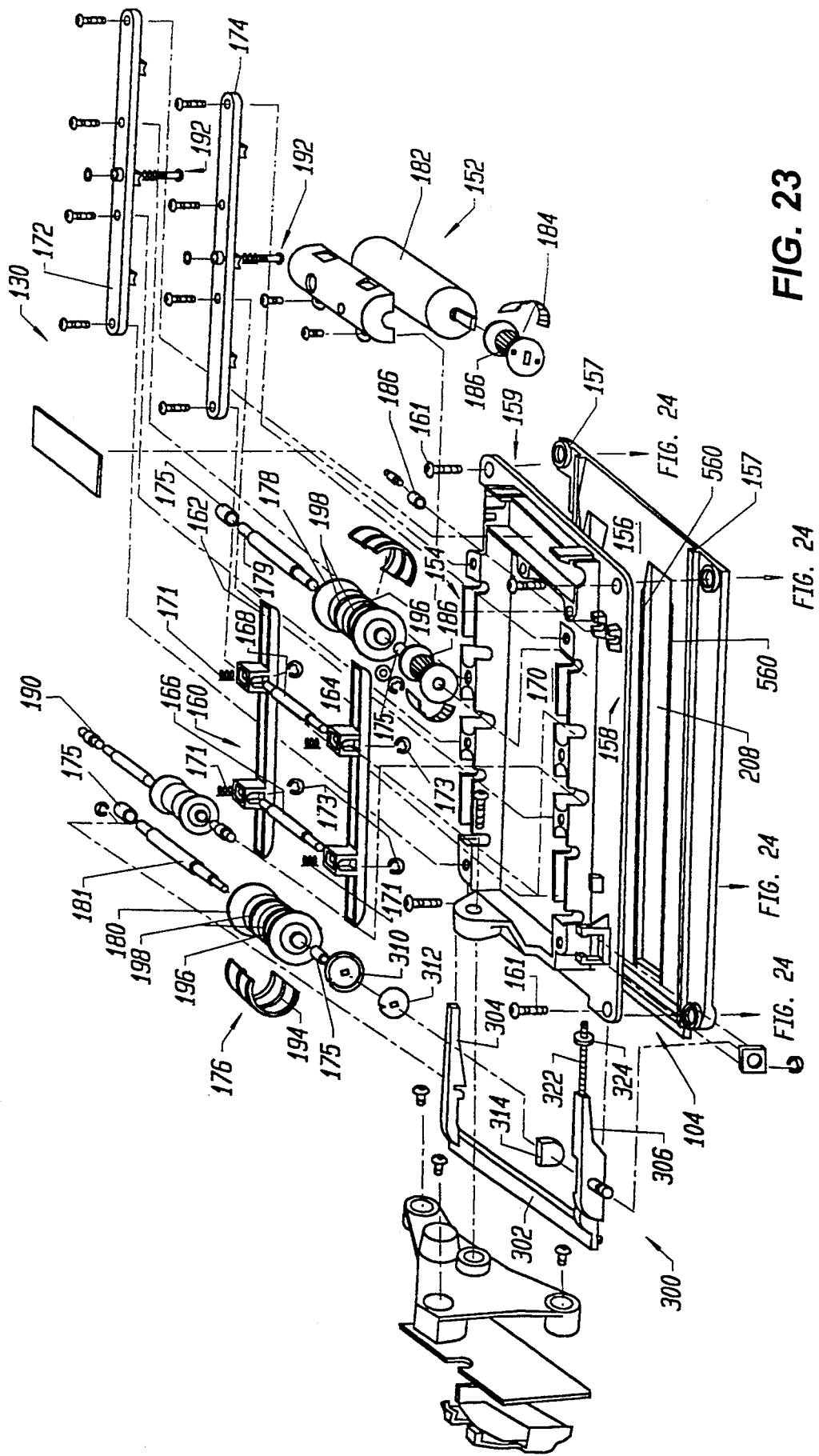
FIG 23 is an exploded view of a data card positioning assembly in accordance with this invention.

In accordance with one aspect of the invention and as depicted in FIG. 23, a data card positioning means 130 is provided in assembly form having an entrance slit 104 with width and height dimensions slightly larger than the card 102, a drive means 152 for pulling the card 102 through the entrance slit and positioning it within a card guide means 154 for orienting the card such that the transducers 150 can detect the data stored thereon. The guide means 154 defines a card guide path 134 between a base plate portion 156 and a card positioning assembly frame 158 that will accommodate various thickness cards. The base plate portion 156 has two parallel raised walls 157 spaced such that a data card 102 will fit between them. The positioning assembly frame 158 defines a centrally located opening 170 and has a flat portion 159 surrounding the opening which rests against the raised walls 157. The base plate portion is attached to the positioning assembly frame by four corner screws 161. The base plate portion 156, the raised walls 157, and the flat portion of the positioning assembly frame 159 define the guide path 134 through which the card 102 travels.

To lessen the friction between the data card 102 and the base plate portion 156 which forms the bottom of the guide path 134, five parallel ribs 560 run substantially the length of the base plate portion 156. Two of the ribs 560 are depicted in FIG. 23. The data card 102 slides along the ribs 560 as it is pulled into the card positioning assembly 130.

Additionally, the card 102 is guided by a pressure plate assembly 160 shown in FIG. 23 as consisting of two parallel ski-shaped elements 162, 164 mounted on a pair of shafts 166, 168. The ends of each shaft are captured by the positioning assembly frame 158 at each end and the ski-shaped elements 162, 164 are disposed within centrally located opening 170.

Figure 24:
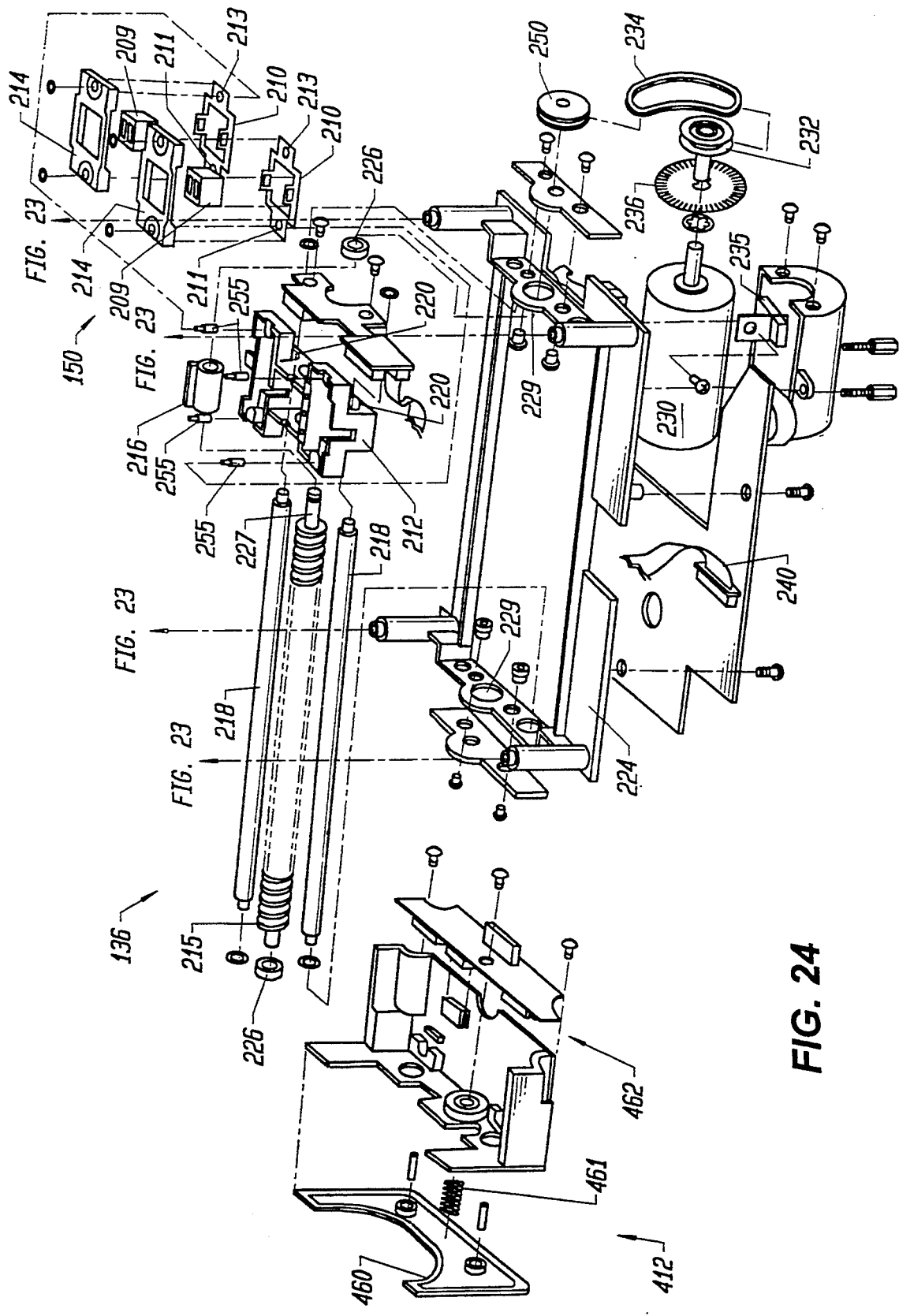
FIG 24 is an exploded view of a transducer positioning apparatus in accordance with this invention.
Figure 25:
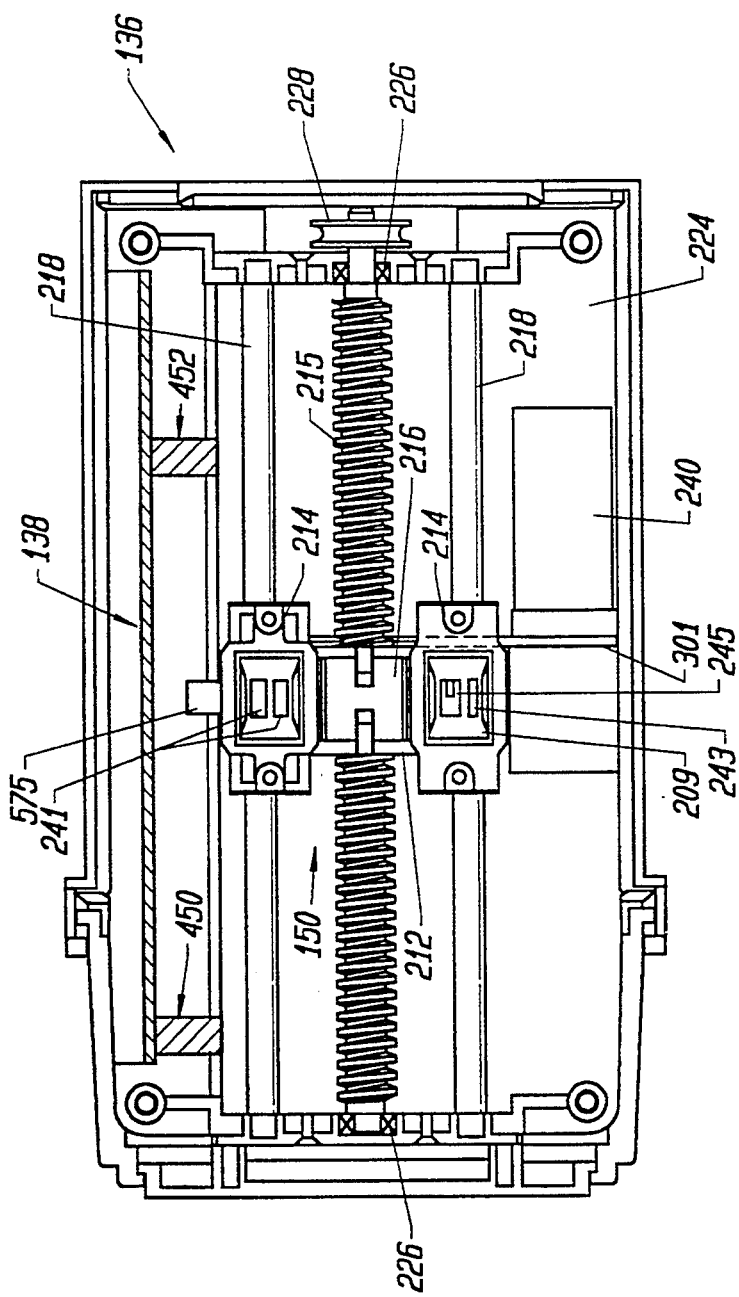
FIG. 25 is a top plan view of a transducer positioning assembly.

As shown in FIGS. 24 and 25, the transducers 150 are, in the preferred embodiment, a pair of industry standard C-size metal cans 309, each housing two magnetic heads. The first stripe 110, storing security information, is accessed by a pair of read-only heads 241. In contrast, the second can contains a read head 243 and a read/write head 245. As is obvious to a person skilled in the art, a number of transducer types are available and useful for reading magnetic tape.

In accordance with one aspect of the invention and depicted in FIGS. 22 and 23, a shutter assembly 300 is provided to enhance system security. The shutter assembly for selectably covering the card guide path 134 consists of a shutter 302 which covers the guide path and two arms 304, 306, each extending in a parallel fashion from each end of the shutter 302. The arms 304, 306 pivot upon the slave pulley shaft 181 which extends through the card positioner frame 158 at both ends. Fixed to the shaft 181, but external to the frame 158 is a plastic sleeve 310 forming a holder for a disk 312 made of a ferrous material such as steel. Correspondingly, attached in a fixed manner to one shutter arm 306 is a small magnet 314 near which the slave pulley shaft rotatably passes. In operation, the magnetic flux of the magnet 314 couples to the ferrous disk 312 such that when the disk 312 rotates, i.e., the slave pulley 180 rotates, the shutter assembly is caused to pivot and open or close the shutter 302 covering the entrance to the card guide path 134 depending upon the direction of rotation of the slave pulley 180. In this embodiment, when the card positioner assembly 136 operates to draw a card 102 into the system, the shutter 302 closes. An Opto-electric sensor 320 detects when the shutter 302 is in the closed position and enables the controller circuitry to begin the card scanning process. If the shutter 302 is pried open during the scanning process, the sensor 320 will instruct the electronics of the occurrence, the scan process will be stopped and the card ejected. The magnetic coupling mechanism opens the shutter 302 when the drive belt is rotated in the expel direction.

Vibration and gravity may cause the shutter 302 to fall to the closed position over time. To ensure that the shutter remains open without periodic counter rotation of the drive belt 176, a counter weight screw 322 and nut 324 are provided to maintain the shutter 320 in the open position. The counter weight force is easily overcome by the rotational coupling force when the drive belt 176 is rotated causing the shutter 302 to close.

The linear data card scanner 100 of the invention is controlled by a single micro-controller integrated circuit such as an M37450M2 manufactured by Mitsubishi, Inc.

The microcontroller 400 has an 8-bit bidirectional data bus, a 16-address bus, and 32 I/O ports.

Four ports are assigned to the keypad connector which enables the system owner to conduct diagnostics or configure system parameters. The diagnostic function enables a self test to be conducted via a disconnectable keypad 490, also referred to as a Handheld Initialization Terminal (HIT). The self-test executes such functions as memory diagnostics, display test, keypad test, motor test, transducer positioner assembly test, and cable connectivity tests. These tests are for both field service diagnostics and manufacturing testing and diagnostics.

Via the keypad 490, various system parameters may be programmed; such as a site ID for accounting purposes, enable the card swallow function, select an interface type from a menu to correspond to a specific application, set a price table, set a clock, enable the security reading circuitry, setting the writing density, adjusting timing and other parameters to conform to a particular application, among other functions.

In an alternative embodiment, a card swallowing feature is incorporated into the system. In accordance with this aspect of the invention and referring to FIG. 21, a rectangular slot 950 is opened in the rear of the housing 122. A data card 102 may be swallowed by the system by passing it through the card positioner assembly 130 and out of the rear slot 950 into a card collecting basket (not shown). The card swallow option can be used for promotional purposes, for example, promotional cards can be given to customers to enable them to receive a specific product one or more times either for free or at a reduced cost. The nature of the card would be encoded upon the ID track. After the promotional card is used for the promotional purpose, the card is swallowed by the system and an appropriate message is displayed. Thus, the producer can track the purchase patterns of the consumers by collecting the promotional cards and tabulating their geographical distribution.

Another use for the swallow feature is to remove invalid or stolen cards from circulation. If, for instance, the card scanner is used in a credit or debit card validation system, the card number can be compared to a list of invalid or stolen cards. If the card is listed, it is swallowed and an appropriate message is displayed. The same process can be used for removing invalid building access cards from circulation.

The cash card dispense and revalue system of this invention has been described above in various embodiments as examples of the principles of the invention, and it should be understood that numerous additional modifications could be made without departing from the scope of this invention as claimed in the following claims.

What is claimed is:

1. A stand-alone unitary magnetic stripe card dispensing and revaluing apparatus for dispensing and revaluing a prevalued magnetic stripe card, said magnetic stripe card including a medium having leading and trailing edges and at least one data stripe formed thereon at a prearranged location and adapted to be used repeatedly as a multi-use monetary transaction medium for performing a monetary transaction to access a different product or service dispensing machine not electrically or mechanically coupled to said card dispensing and revaluing apparatus, said card dispensing and revaluing apparatus comprising:

a bill validator apparatus for accepting and validating a cash payment of a monetary amount;

a credit/debit card reader and validator apparatus for accepting and validating a credit/debit payment of a monetary amount;

a personal identification number (PIN) keypad coupled to said apparatus to permit a customer to enter a personal identification number to access monetary funds in a debit account as payment of said monetary amount;

a modem for automatically dialing and communicating with a host computer having a credit/debit database in response to recognizing a request to obtain a magnetic stripe cash card using said credit card or said debit card as payment of said monetary amount, said host computer validating said credit card based upon a comparison of data in said credit/debit database with the amount of credit/debit selected as said payment;

a magnetic stripe card dispenser for storing at least one prevalued magnetic stripe card and for dispensing said prevalued magnetic stripe card upon identifying a request for a magnetic stripe card and accepting and validating said payment of said predetermined monetary amount;

a magnetic stripe card linear reader/writer apparatus including:

revalue apparatus for revaluing the monetary value stored on said magnetic stripe card upon accepting said card into said reader/writer apparatus by altering data passively magnetically recorded on said at least one magnetic stripe of said card, said data representing the instantaneous cash value of said card, said instantaneous cash value being stored only on said card, said means for revaluing being capable of increasing said instantaneous cash value of said card by an arbitrary monetary amount;

said magnetic stripe card reader/writer apparatus adapted for reading and recording a first magnetic data stripe having security information stored thereon and for reading and recording a second information stripe having said instantaneous cash value of said card and card identification information stored thereon;

a linear card guide apparatus for defining a linear card guide path and having an entrance slit for accepting said card into said guide path;

said linear card guide apparatus including a pressure plate for biasing said data card toward said transducer apparatus;

a latchable shutter assembly for selectably covering the card guide path at said entrance slit for enhanced security;

a first card drive apparatus cooperatively associated with said linear card guide for driving said card through said entrance slit and into said card guide and for positioning said card at a stationary prearranged location within said linear reader/writer apparatus;

said first card drive comprising a first bidirectional drive for driving said data card alternatively in a forward direction to pull said data card through said entrance slit and in a reverse direction to discharge said data card through said entrance slit;

said first card drive being adapted to drive cards of varying thicknesses so that cards of varying thickness and material are properly read and written to by said card linear reader/writer apparatus including magnetic stripe paper cards, magnetic stripe plastic credit cards, and magnetic stripe plastic debit cards;

said first card drive including card swallowing apparatus for retaining a magnetic stripe card submitted to said card reader/writer apparatus for revaluing when said card has predetermined characteristics including card invalidity, card damage, cards identified as stolen based on comparison with a list of cards stored in a database, cards having a predetermined detectable amount of card wear, and cards identifiable as a promotional card based on information magnetically stored on said card that enables the holder to receive a specific product one or more times either for free or at a reduced cost and enables the card issuer to track the purchase patterns of consumers by collecting the swallowed promotional cards and tabulating the geographical distribution of their use;

said card swallow apparatus including a rectangular slot opened in the rear of the housing of said magnetic strip card reader/writer, said first card drive passing said card through said stationary prearranged location and out of said rear slot into a card collecting receptacle;

a transducer apparatus for communicating with said at least one data stripe of said card positioned by said first card drive;

said transducer apparatus including at least one magnetic head for reading and writing data to said at least one data stripe and an electrical circuit for processing said data read from said data stripe and for transmitting data to said data stripe; and a second drive cooperatively associated with said transducer apparatus for driving said transducer apparatus in a linear manner along said at least one data stripe of said card at said stationary prearranged location;

said second drive comprising a second bidirectional drive for linearly driving said transducer apparatus alternately in one direction and in an opposite direction such that said data on said at least one data stripe is detected by said transducer apparatus;

said magnetic stripe card reader/writer apparatus maintaining said magnetic stripe card within said card reader/writer apparatus when revaluing said card so that access to said card from the outside of said apparatus is prevented and attempts at fraudulently revaluing said card are thwarted;

said magnetic stripe card reader/writer apparatus accepting said data card upon user insertion of the card into said entrance slit of said reader/writer apparatus, said insertion of the card triggering a sensor apparatus which engages a mechanism that pulls said card through said entrance slit and positions it at said predetermined stationary position within said card reader/writer apparatus for subsequent data reading and writing; and microcontroller having a bidirectional data bus, an address bus, and a plurality of I/O ports;

keypad connector coupled to a least one of said I/O ports for removably coupling a hand-held keypad;

diagnostics apparatus to diagnose and configure parameters for said magnetic stripe card dispensing and revaluing apparatus; said diagnostics including as memory diagnostics, display test, keypad test, motor test, transducer drive test, and cable connectivity tests; said system parameters including such as a site ID for accounting purposes, enable the card swallow function, select an interface type from a menu to correspond to a specific application, set a price table, set a clock, enable the security reading circuitry, setting the writing density, and adjusting timing; and memory storage means internal to said apparatus for selectively storing and recalling transaction information relating to each operation of said dispensing and revaluing apparatus;

said payment acceptance means, said magnetic stripe card dispenser, said magnetic stripe card reader/writer apparatus, and said card retainer means being located in a single stand-alone housing and not coupled to said different product dispensing machine;

whereby a cash balance between payments made to said payment acceptance apparatus and debits incurred by purchases from said different product dispensing machine is recorded only on said magnetic stripe cash card, and whereby said magnetic stripe cash card provides the only communication of monetary value between said card dispensing and revaluing apparatus and said different product dispensing machine.

2. A magnetic-stripe card transaction system for issuing and revaluing a magnetic stripe card and for selling and purchasing products and services from any of a plurality of product vending machines using said card, said card having the instantaneous cash value of said card encoded in at least one magnetic stripe, said system comprising:

a stand-alone unitary card dispensing and revaluing station for dispensing and revaluing a magnetic stripe cash card;

a plurality of second card reader/writer apparatus, each said second card reader/writer apparatus being mechanically and electromagnetically coupled to one of said plurality of product vending machines and adapted to read from and write to said magnetic stripes on said magnetic stripe card, said reading and writing being performed in a format compatible to a format of said first card reader/writer apparatus coupled to said dispensing and revaluing station;

each said vending machine second card reader/writer being mechanically attached to a different one of said product vending machines and electrically coupled to a dispensing controller within said product vending machine, said product vending machine generating signals directing said product vending machine to actually dispense said product, said second card reader/writer apparatus capable of increasing and decreasing the instantaneous cash value encoded on said card by an arbitrary monetary amount;

said vending machine card reader/writer apparatus having a mechanical form factor and electrical interface, including electrical connector plugs having pin configurations that mate with the electrical connectors from said dispensing controller, permitting retrofit installation into a standard bill validator opening in a preexisting vending machine without altering mechanical construction of said vending machine;

said stand-alone unitary card dispensing and revaluing station comprising:

a bill validator apparatus for accepting and validating a cash payment of a monetary amount;

a credit/debit card reader and validator apparatus for accepting and validating a credit/debit payment of a monetary amount;

a personal identification number (PIN) keypad coupled to said apparatus to permit a customer to enter a personal identification number to access monetary funds in a debit account as payment of said monetary amount;

a modem for automatically dialing and communicating with a host computer having a credit/debit database in response to recognizing a request to obtain a magnetic stripe cash card using said credit card or said debit card as payment of said monetary amount, said host computer validating said credit card based upon a comparison of data in said credit/debit database with the amount of credit/debit selected as said payment;

a magnetic stripe card dispenser for storing at least one prevalued magnetic stripe card and for dispensing said prevalued magnetic stripe card upon identifying a request for a magnetic stripe card and accepting and validating said payment of said predetermined monetary amount; and a magnetic stripe card linear reader/writer apparatus;

said payment acceptance means, said magnetic stripe card dispenser, said magnetic stripe card reader/writer apparatus, and said card retainer means being located in a single stand-alone housing and not coupled to said different product dispensing machine;

each said first and second magnetic stripe card linear reader/writer apparatus comprising:

revalue apparatus for revaluing the monetary value stored on said magnetic stripe card upon accepting said card into said reader/writer apparatus by altering data passively magnetically recorded on said at least one magnetic stripe of said card, said data representing the instantaneous cash value of said card, said instantaneous cash value being stored only on said card, said means for revaluing being capable of increasing said instantaneous cash value of said card by an arbitrary monetary amount;

said magnetic stripe card reader/writer apparatus adapted for reading and recording a first magnetic data stripe having security information stored thereon and for reading and recording a second information stripe having said instantaneous cash value of said card and card identification information stored thereon;

a linear card guide apparatus for defining a linear card guide path and having an entrance slit for accepting said card into said guide path;

said linear card guide apparatus including a pressure plate for biasing said data card toward said transducer apparatus;

a latchable shutter assembly for selectably covering the card guide path at said entrance slit for enhanced security;

a first card drive apparatus cooperatively associated with said linear card guide for driving said card through said entrance slit and into said card guide and for positioning said card at a stationary prearranged location within said linear reader/writer apparatus;

said first card drive comprising a first bidirectional drive for driving said data card alternatively in a forward direction to pull said data card through said entrance slit and in a reverse direction to discharge said data card through said entrance slit;

said first card drive being adapted to drive cards of varying thicknesses so that cards of varying thickness and material are properly read and written to by said card linear reader/writer apparatus including magnetic stripe paper cards, magnetic stripe plastic credit cards, and magnetic stripe plastic debit cards;

said first card drive including card swallowing apparatus for retaining a magnetic stripe card submitted to said card reader/writer apparatus for revaluing when said card has predetermined characteristics including card invalidity, card damage, cards identified as stolen based on comparison with a list of cards stored in a database, cards having a predetermined detectable amount of card wear, and cards identifiable as a promotional card based on information magnetically stored on said card that enables the holder to receive a specific product one or more times either for free or at a reduced cost and enables the card issuer to track the purchase patterns of consumers by collecting the swallowed promotional cards and tabulating the geographical distribution of their use;

said card swallow apparatus including a rectangular slot opened in the rear of the housing of said magnetic strip card reader/writer, said first card drive passing said card through said stationary prearranged location and out of said rear slot into a card collecting receptacle;

a transducer apparatus for communicating with said at least one data stripe of said card positioned by said first card drive;

said transducer apparatus including at least one magnetic head for reading and writing data to said at least one data stripe and an electrical circuit for processing said data read from said data stripe and for transmitting data to said data stripe; and a second drive cooperatively associated with said transducer apparatus for driving said transducer apparatus in a linear manner along said at least one data stripe of said card at said stationary prearranged location;

said second drive comprising a second bidirectional drive for linearly driving said transducer apparatus alternately in one direction and in an opposite direction such that said data on said at least one data stripe is detected by said transducer apparatus;

said magnetic stripe card reader/writer apparatus maintaining said magnetic stripe card within said card reader/writer apparatus when revaluing said card so that access to said card from the outside of said apparatus is prevented and attempts at fraudulently revaluing said card are thwarted;

said magnetic stripe card reader/writer apparatus accepting said data card upon user insertion of the card into said entrance slit of said reader/writer apparatus, said insertion of the card triggering a sensor apparatus which engages a mechanism that pulls said card through said entrance slit and positions it at said predetermined stationary position within said card reader/writer apparatus for subsequent data reading and writing; and a microcontroller having a bidirectional data bus, an address bus, and a plurality of I/O ports;

a keypad connector coupled to a least one of said I/O ports for removably coupling a hand-held keypad;

diagnostics apparatus to diagnose and configure parameters for said magnetic stripe card dispensing and revaluing apparatus; said diagnostics including as memory diagnostics, display test, keypad test, motor test, transducer drive test, and cable connectivity tests; said system parameters including such as a site ID for accounting purposes, enable the card swallow function, select an interface type from a menu to correspond to a specific application, set a price table, set a clock, enable the security reading circuitry, setting the writing density, and adjusting timing; and memory storage means internal to said apparatus for selectively storing and recalling transaction information relating to each operation of said dispensing and revaluing apparatus;

whereby a cash balance between payments made to said payment acceptance apparatus and debits incurred by purchases from said different product dispensing machine is recorded only on said magnetic stripe cash card, and whereby said magnetic stripe cash card provides the only communication of monetary value between said card dispensing and revaluing apparatus and said different product dispensing machine.

* * * * *